(12) United States Patent
Jackson et al.

(10) Patent No.: US 8,516,071 B2
(45) Date of Patent: Aug. 20, 2013

(54) SYSTEMS AND METHODS FOR CREATING VIRTUAL UNIVERSAL PLUG-AND-PLAY SYSTEMS

(75) Inventors: Bruce K. Jackson, Bournemouth (GB); Mark L. Caunter, Christchurch (GB); Steven R. Geach, Weymouth (GB)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 12/642,853

(22) Filed: Dec. 20, 2009

(65) Prior Publication Data

US 2010/0312851 A1 Dec. 9, 2010

Related U.S. Application Data

(60) Provisional application No. 61/183,761, filed on Jun. 3, 2009.

(51) Int. Cl.
*G06F 15/16* (2006.01)
(52) U.S. Cl.
USPC ........................................................ 709/217
(58) Field of Classification Search
USPC ........................................................ 709/217
See application file for complete search history.

(56) References Cited

U.S. PATENT DOCUMENTS

2005/0012829 A1* 1/2005 Tashiro et al. ........... 348/231.99
2005/0232583 A1 10/2005 Kubota

FOREIGN PATENT DOCUMENTS

| EP | 1742153 | 1/2007 |
|----|---------|--------|
| EP | 1771008 A2 | 4/2007 |
| WO | WO03049370 | 6/2003 |
| WO | WO2008087374 | 7/2008 |

OTHER PUBLICATIONS

International Search Report and Written Opinion—PCT/US2010/037250—International Search Authority, European Patent Office, Dec. 29, 2010.

(Continued)

*Primary Examiner* — Thomas Tarcza
*Assistant Examiner* — Maceeh Anwari
(74) *Attorney, Agent, or Firm* — DeLizio Gilliam, PLLC

(57) ABSTRACT

Methods and devices enable a device located on a source network to appear as a virtual device on a target network. Agent applications running on computers on the source and target networks communicate over a peer-to-peer network enabled by a super-peer networking server on the Internet. To share a device, the target network agent requests the source network agent to provide access to a device in the source network. The source network agent sends the device name, properties, and service template information to the target network agent. The target network agent uses the received information to announce itself as the device to the target network. Devices on the target network may request device services from the target network agent. Such requests are repackaged by the target network agent and sent to the source network agent. The source network agent redirects the service request to the actual device and redirects received responses to the target network agent. The target network agent receives the processes forwards service response to the requesting device. Thereafter, the requesting device on the first network can directly access services from the device on the second network as if the two devices were on the same network. Using such methods, devices on a local network may access services available on an Internet server as if the server was on the local network.

29 Claims, 26 Drawing Sheets

(56) References Cited

OTHER PUBLICATIONS

Lee, Il-Woo et al.: "Service Platform and Social Networking Service Based on Peer-to-Peer Networking" Consumer Communications and Networking Conference, 2009. CCNC 2009. 6th IEEE, IEEE, Piscataway, NJ, USA, Jan. 10, 2009, pp. 1-2, XP031425426, ISBN: 978-1-4244-2308.

Taein Hwang, et al., "Personal Mobile A/V Control for Home-to-Home Media Streaming," International Conference on Consumer Electronics, 2008. ICCE 008. Digest of Technical Papers, IEEE, Piscataway, NJ, USA, Jan. 9, 2008, pp. 1-2, XP031297429, ISBN: 978-1-4244-1458-1.

Hwang, Taein et al., "Personal Mobile A/V Control Point for Home-to-Home Media Streaming", IEEE Transactions on Consumer Electronics, vol. 54, No. 1 Feb. 2008, 6 pages.

"RU Application No. 2011154353108 Office Action", Feb. 9, 2013, 10 pages.

"KIPO Notice of Grounds for Rejection, KR Application No. 2012-7000180", Feb. 27, 2013, 15 pages.

* cited by examiner

FIG. 9C
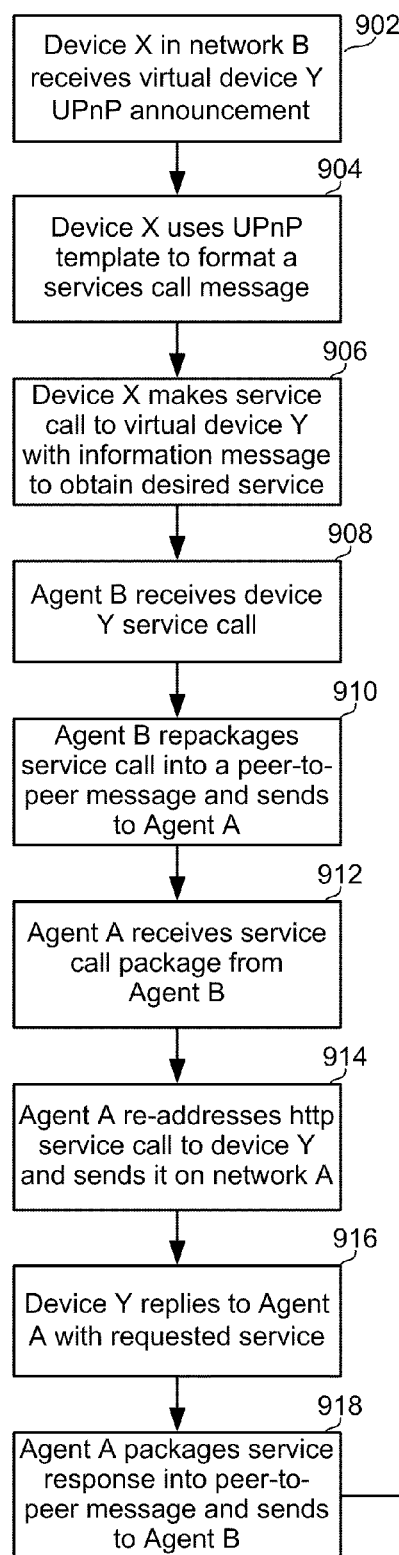
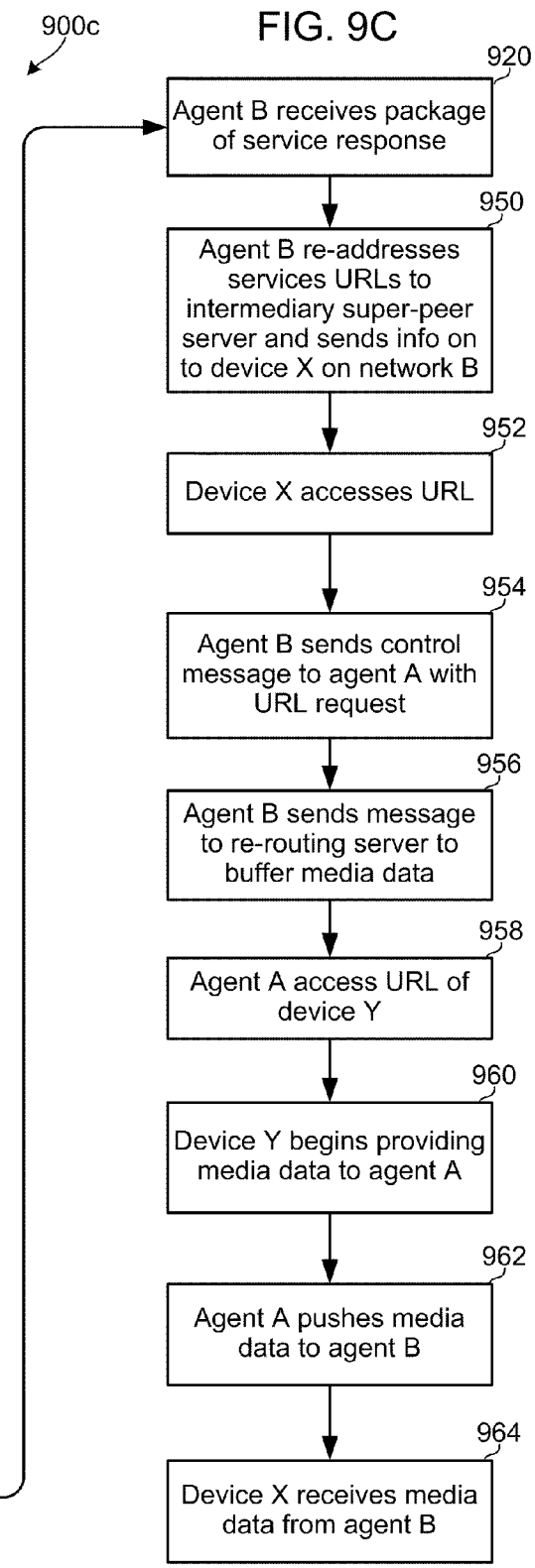

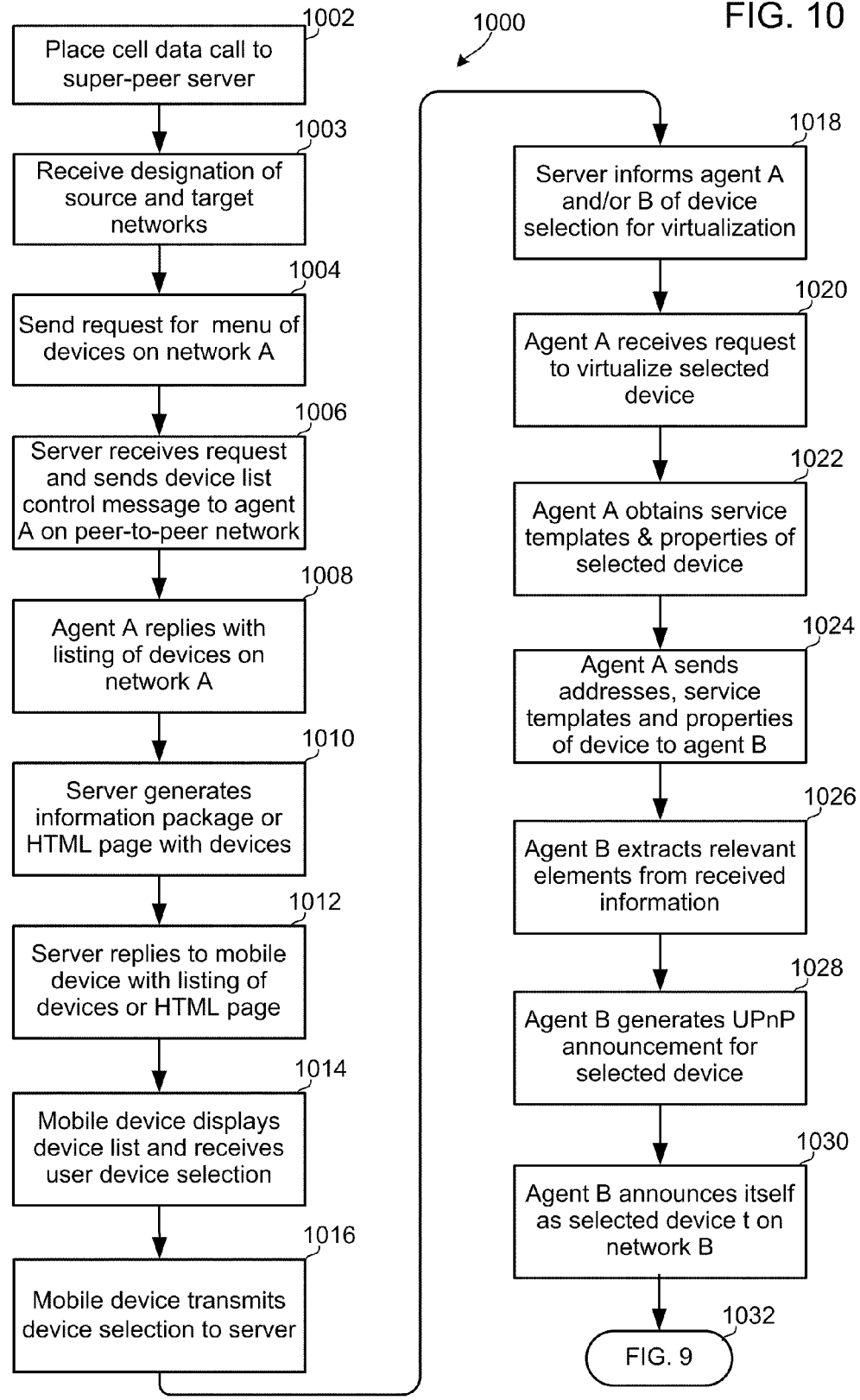

SYSTEMS AND METHODS FOR CREATING VIRTUAL UNIVERSAL PLUG-AND-PLAY SYSTEMS

RELATED APPLICATIONS

This application claims the benefit of priority to U.S. Provisional Patent Application No. 61/183,761 entitled Systems And Methods For Creating Virtual Universal Plug-And-Play Systems, filed Jun. 3, 2009, the entire contents of which are hereby incorporated by reference.

FIELD OF THE INVENTION

The present invention relates generally to computer networks, and more particularly to remote control of streaming media selection and authorization between private networks.

BACKGROUND

Increasingly, people are building up collections of digital media, such as audio files, video files, digital images, etc. While portable memory devices such as thumb drives, CD-R disks, and MP3 players have provided some capability to physically carry such files from place to place for use, often such memory devices are too limited in carrying capacity as well as being too easily lost or stolen for entrusting with sensitive data files. Still, collectors of digital media would benefit from being able to access their collections without the necessity of setting up an elaborate network bridge.

SUMMARY

Methods and devices enable a device located on a source network to appear as a virtual device on a target network. Agent applications running on computers on the source and target networks and on a central network server communicate over a peer-to-peer network enabled by a super-peer networking server on the Internet. In order to share a device, the central server agent requests the source network agent to provide access to a device in the source network and directs this information to be sent to a target network. The source network agent sends the device name, properties and service template information to the target network agent. The target network agent uses the received information to announce itself as the device to the target network. Devices on the target network may request device services from the target network agent. Such requests are repackaged by the target network agent and sent to the source network agent. The source network agent redirects the service request to the actual device and redirects received responses to the target network agent. The target network agent receives the response, processes it, and forwards service response to the requesting device. Thereafter, the requesting device on the first network can directly access services from the device on the second network, as if the two devices were on the same network. Using such methods, devices on a local network may also access services available on an Internet server as if the server was on the local network.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 9A-9C are process flow diagrams of embodiment methods for obtaining services and receiving content from a device on a first network appearing as a virtual device on a second network.

FIG. 10 is a process flow diagram of an embodiment method for using a mobile device to enable a device on a first network to be accessed as a virtual device on a second network.

DETAILED DESCRIPTION

Figure 1:
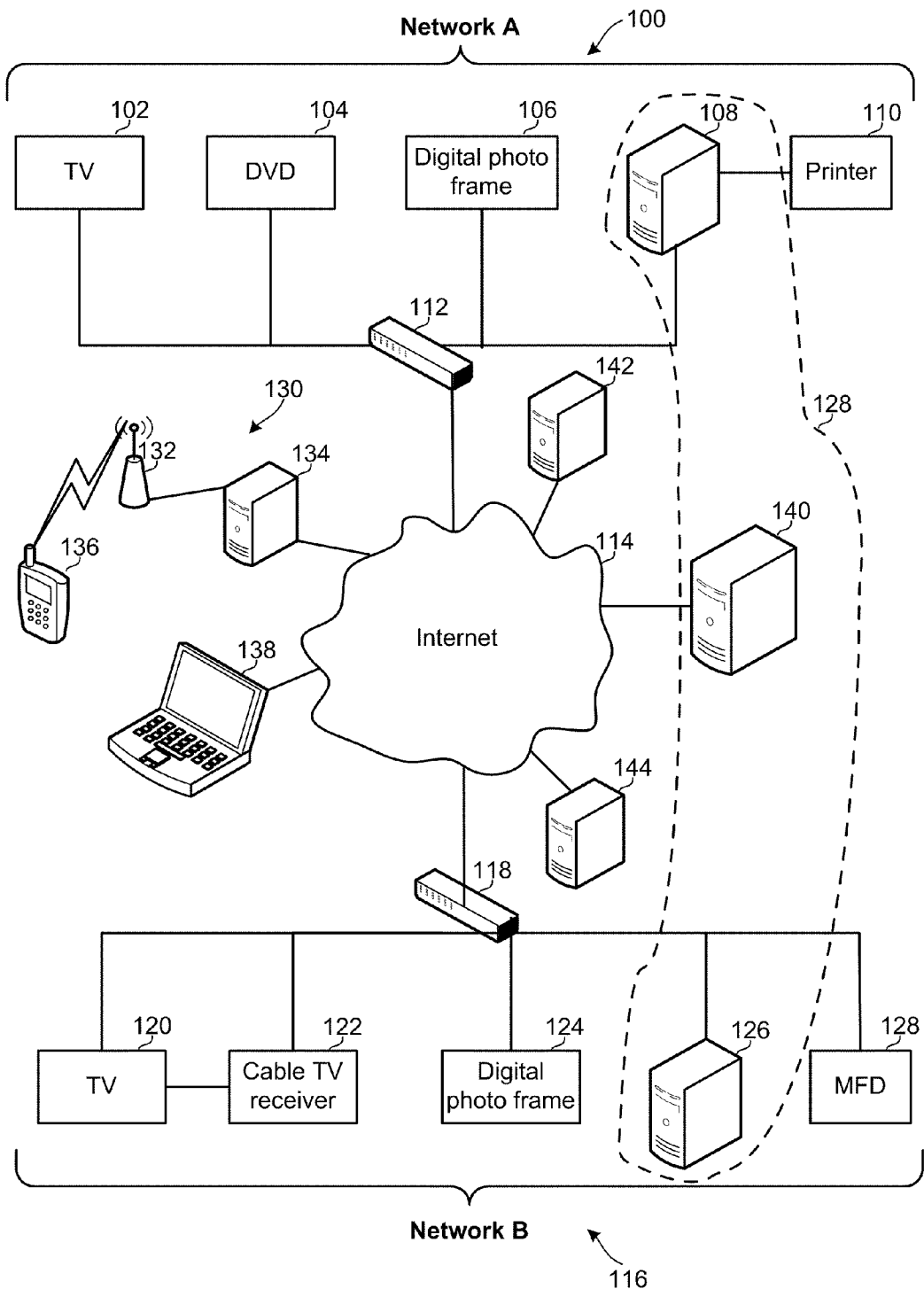
FIG. 1 is a communication system block diagram illustrating a communication system suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "handheld device" refer to any one or all of cellular telephones, personal data assistants (PDA's), palm-top computers, wireless electronic mail receivers, multimedia Internet enabled cellular telephones, Global Positioning System (GPS) receivers, wireless gaming controllers, and similar personal electronic devices that include a programmable processor and memory, are configured to communicate with a wireless communication network, and have a web browser.

As used herein, the terms "computer," "personal computer" and "computing device" refer to any programmable computer system that is known or that will be developed in the future. In a preferred embodiment a computer will be coupled to a network such as described herein. A computer system may be configured with software instructions to perform the processes described herein.

As used herein, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "device" refers to any electronic device, several examples of which are mentioned or described herein. In a preferred embodiment, a device may be a "universal plug-and-play" (UPnP) device that may be coupled to a network.

The term "peer-to-peer network" is intended to encompass any form of peer-to-peer network technology known or that may be developed in the future. While some embodiments refer to peer-to-peer networks that make use of hypertext transfer protocol (HTTP) messaging, such references are intended merely to serve as examples, and not to limit the scope of the claims to any particular networking technology.

For ease of reference, examples illustrating the functioning of various embodiments may refer to networks as first and second networks or users, or to networks and users A and B. For example, a first user may be referred to as "user A" and a second user may be referred to as "user B." Such references in the figures and the descriptions are arbitrary and used to simplify network and user references, and thus are not intended to limit the scope of the claims to just two networks or just two users, or to limit particular users to particular networks, as the various embodiments support any number of networks and users.

Various aspects will be presented in terms of systems that may include a number of components, modules, and the like. It is to be understood and appreciated that the various systems may include additional components, modules, etc., and may not include all of the components, modules, etc. discussed in connection with the figures. A combination of these approaches may also be used.

The various embodiments described herein provide methods and systems that enable discovery of a device or service running on a first network and create a virtual rendition of that device or service on a second network so that it may be accessed as if it were an actual network device. In a preferred embodiment, the first and second networks are peer networks using Universal Plug-and-Play ("UPnP", e.g., http://www.upnp.org) devices linked together with a programmable computer, such as a personal computer. The first and second networks also include a connection to a wide area network, such as via a router or home gateway providing a connection to the Internet, through which communications can be established between each of the programmable computers. The first and second networks may implement Ethernet or 802.11 wireless communications, a combination of both these communications technologies, or another networking technology capable of supporting Internet Protocol (IP). Each of the programmable computers is configured with an agent application which discovers the plug-and-play devices within its local network. The agent application enables each of the computers to join a peer-to-peer network including a super-peer server on the wide-area network, through which connections can be established to other computers having similar agent applications installed. Similar to a social network, users can invite other networks to establish a peer-to-peer network link through which devices and services (e.g., file sharing) may be accomplished via the wide-area network, such as the Internet.

To initiate device or service sharing, a first agent in a first computer in a first network may send a request through the peer-to-peer network link to a second agent in a second computer in a second network for access to one or more devices or services in the second network. The second agent may obtain names, properties, and service templates of the plug-and-play devices on the second network, and send such information to the first agent via the peer-to-peer network link. The first agent uses the received plug-and-play information to mimic the requested device or service on the first network by announcing itself as a UPnP device having the properties and service templates received from the second agent. Thus, the first agent acts as a virtual device or service announcing the properties of the device or service in the second network. UPnP devices on the first network may then request services from the virtual device or service in the ordinary manner of the UPnP network. A request for services to the virtual device or service may be repackaged by the first agent, and sent to the second agent in the second network via the peer-to-peer network link. The second agent in the second network may re-address the service request and send it to the actual device in the second network. That device responds to the second agent in an ordinary manner. The second agent then packages the received response and sends it to the first agent via the peer-to-peer network link. The first agent receives the package, processes the received information, such as to change universal resource locator (URL) or IP addresses to a public IP address for the second network or the actual device, and forwards the service response to the requesting device on the first network. Thereafter, the requesting device on the first network can access services from the device on the second network via the first and second agents, with requested files and services communicated between the first and second agents (as opposed to through the peer-to-peer network) as if the two devices were on the same network. Using such methods, devices on a local network may access services available on a second local network as if the device was on the local network. Further, such methods may enable sending content from a computer or device in a first network for presentation, printing or display on a device on a second network.

An example communication system suitable for implementing the various embodiments is illustrated in FIG. 1. Such a communication system may include two or more local networks 100, 116, also labeled and referred to herein as networks A and B, which may be typical home networks. The local area networks 100, 116 may be implemented as Ethernet or 802.11 wireless communications, or a combination of both. The local area networks 100, 116 include one or more UPnP devices 102, 104, 106, 110, 120, 122, 124, 128. In the illustrated example communication system both networks 100, 116 are connected to the Internet 114 via a router 112, 118, or home gateway as would be typical in a home network system. The local networks 100, 116 also include programmable computers 108, 126, such as personal computers, computer game consoles, or local area network servers. In some implementations the programmable computer 108, 126 and the router 112, 118 or home gateway may be implemented in the same programmable device, such as a personal computer or game console configured to function as a home gateway. In some implementations, one or more of the local networks 100, 116 may not include a router 112, 118, such as when one network includes only a programmable computer 108, 126 coupled to the Internet 114.

A local network 100, 116 may include a variety of UPnP devices, such as televisions 102, 120, media players (e.g., a digital video disc (DVD) player 104), content sources (e.g., a satellite or cable TV receiver box 124), and output devices (e.g., digital photo frame 106, printers 110, and multifunction devices 128). Any number of different UPnP devices may be implemented, including UPnP devices that may be developed in the future. Additionally, content storage devices, such as computer hard drive systems within computing devices 108, 126 may store digital content (e.g., music, photograph, video and text files) that may be displayed or played on one or more of the UPnP devices on the local networks 100, 116.

Optionally, the communication system may include other computing devices, such as personal computers 138 and mobile devices 136 with access to the Internet 114. For example, mobile devices 136, such as cellular telephones, may access the Internet via a wireless communication network 130 (e.g., a WIFI or cellular telephone data communication network). Such wireless communication networks 130 may include a plurality of base stations 132 coupled to a gateway or Internet access server 134 coupled to the Internet 114. Personal computers may be coupled to the Internet 114 in any conventional manner, such as by wired connections via an Internet gateway (not shown) or by a wireless communication network 130.

The various embodiments may also include a super-peer networking server 140, a registration server 142, and, optionally, a re-routing server 144 located on the public Internet 114. The super-peer networking server 140 may be any commercially available server configured with software instructions according to the various embodiments to enable peer-to-peer communications between Internet-connected computing devices 108, 126 configured with agent applications described herein. The registration server 142 may be any commercially available server configured with software instructions to host a webpage that can receive requests from web browsers (either on a mobile device 136 with a suitable browser, or on computing devices 108, 126, 138 configured with a web browser). The optional re-routing server 144 may be any commercially available server configured with software instructions to re-route communications between local area networks 100, 116 when both networks do not provide port forwarding functionality.

In various embodiments, the super-peer networking server 140, the registration server 142, and, optionally, the re-routing server 144 are not limited to any configuration or particular number of devices, and may be implemented within a single server, within two servers, or within several servers. Further, several super-peer networking servers 140 may be located on the Internet to support a large number of peer-to-peer communication links.

The super-peer networking server 140 may be configured with software instructions to enable various computing devices 108, 126 to locate each other and pass messages and data in a peer-to-peer manner without knowing the Internet Protocol (IP) addresses on the end point devices. The location of each end point computing device 108, 126 may be determined using an addressing scheme of unique names, rather than IP addresses. In such an addressing scheme, each address is known as a domain ID. Therefore, logically, each domain ID technically represents a single network subnet or local network, and may be referred to as a "place" (for example, my house, my office, etc). To enable peer-to-peer communications, the super-peer networking server 140 has access to a database of user identities or accounts, and associated domain IDs. This database of accounts may be maintained or added to by the registration server 142, which users may access via the Internet 114. A single user may have many associated domain IDs or "places".

Since the super-peer networking server 140 has access to the IP address of network computing devices configured with an agent application, a peer-to-peer network 128 can be created when the computing devices 108, 126 are informed of each other's domain ID, and of the IP address of the super-peer networking server 140. Users can create peer-to-peer networks by inviting others registered with the super-peer networking server 140 (e.g., via the registration server 142) to network with them. In this manner, the creation of peer-to-peer networks via the super-peer networking server 140 may function like a social network site (e.g., Facebook or MySpace) among users registered with the super-peer networking server 140. Thus, users may connect "friends" to their network by indicating that a domain ID or other reference to another system account can communicate with the user's network. When two networks 100, 116 are linked into a peer-to-peer communication link 128, messages from one network may be directed to the super-peer networking server 140, which uses the address domain ID to look up and forward messages to the other network.

The various embodiments make use of the functionality of UPnP devices to enable a UPnP-enabled device present on one network 100 to be available "virtually" on a second network 116. UPnP is a well-known protocol for the discovery and access of services provided by devices to one another in a peer-to-peer manner on a network subnet. In a local network of UPnP devices, each device may use a method of IP multicasting to announce their presence on the network (referred to as "advertisement" or "advertisement announcement"), and to search for other UPnP devices on the network (referred to as "discovery"). In a conventional UPnP network, the IP multicast of UPnP device advertisements and discovery is limited to a single network subnet. Thus, in FIG. 1, device discovery/advertisement functions are limited to each of the local network A 100, and network B 116, and the discovery/advertisement functions cannot be routed to the Internet or onwards outside the local network in any way. It is therefore impossible for UPnP devices in a first network 100 to "see" or interact with UPnP devices in a second network 116 using standard UPnP functionality.

The various embodiments enable a UPnP device and associated services located in a first network 100 to be "virtualized" and made available on a second network 116. To enable such functionality an agent application is deployed on a computing device 108, 126 on each local network 100, 116. The agent application is a software program that configures the computing devices 108, 126 to interact with UPnP devices and services on their respective local networks 100, 116 in a number of ways, to communicate with the super-peer networking server 140 via the Internet 114, and to respond to or be controlled by external messages received from the super-peer networking server 140 via the Internet 114. Control messages may be sent to the super-peer networking server 140 by the registration server 142 in response to user interactions with a user interface website hosted by the registration server 142.

Within each local network 100, 116, the agent application may listen for advertisement messages from UPnP devices. Also, from time to time the agent application may send out discovery messages on the local network 100, 116 in order to discover UPnP devices connected to the network. In this manner, the agent application can build up a complete list of all of the UPnP devices and services that are available on its local network 100, 116. This list of UPnP available devices and services may be maintained in a cache within the computing device 108, 126 on which the agent application is implemented.

Once users are registered with the system via the registration server 142, a process which includes downloading the agent application to their computing devices, they may access the registration server 142 (or another server) via any computing device 136, 138 linked to the Internet 114 in order to select another registered network with which to share resources. When users sign in to the registration server 142 by accessing and identifying themselves to a website hosted on the server, they may be presented with a list of their own domain IDs ("places") and a list of their "friends" (i.e., individuals who the user has indicated can link to the user's network domains), as well as their friends' domains.

In order to share devices or services, a user may access the registration server 142 from any computing device 136, 138 and use a user interface website hosted on the registration server 142 to select one of the user's friend's domains as a "target" to which a device or file will be made available. Before or after a target network has been selected the user may also be presented with a list of the user's own domains that may be shared (referred to as a "source" domain). When the user selects one of the user's domains as the source domain, the registration server 142 may send a control message to the super-peer networking server 140. The super-peer networking server 140 may relay the control message to the computer 108 in the selected source network 100. This control message prompts the agent application running in the computer 108 to generate a list of UPnP devices that have been discovered by the agent application on its local network 100. In response, the agent application transmits the list of UPnP devices back to the registration server 142 via the request path through the super-peer networking server 140.

The registration server 142 receives the list of UPnP devices on the source network and may generate an information or webpage response to the user's selection which is transmitted to the user's computing device 136, 138 for display to the user. In such a listing of UPnP devices, each device may be uniquely identified by a UPnP property referred to herein as the Universally Unique ID (or UUID). In this manner, the user is able to see all of the UPnP devices located in one of the user's domains, even if the server is not physically present on that network, such as when the user accesses the registration server 142 via a mobile device 136 or another computer 138 linked to the Internet 114.

As part of a user interface webpage presenting the list of the user's UPnP devices on the source domain, the user may be able to select a particular UPnP device or service, and be provided with an option to "virtualize" the selected device or service on the target domain. If the user enters a response to virtualize the selected device or service, the registration server 142 may send a control message via the super-peer networking server 140 to the computer 108 in the source domain (i.e., the user's network 100). This control message may identify both the UUID of the selected UPnP device, and the target domain ID. The agent application running on the computer 108 interprets the control message, locates the UPnP device referred to in the message, and builds a response message containing the UPnP device description and the UPnP service descriptions of the device. The agent application may send this response message along with the target domain ID to the super-peer networking server 140. The super-peer networking server 140 looks up the IP address of the computer associated with the domain ID (e.g., in a user account database) and relays the message to that IP address (i.e., the IP address of the computer 126 in the target network 116). The agent application in the computer 126 in the target domain receives the response message and reads the device description and service descriptions stored in the message. Using the received device description and service descriptions, the agent application performs a UPnP device advertisement on the target network 116. These advertisement messages contain a URL indicating where the device can be accessed by other UPnP devices on the target network 116. This URL is constructed by the agent application running on the computer 126 in the target domain to point to itself, in particular to a simple HTTP server running within the agent application. In this manner, the agent application announces itself as the device selected by the user in the source domain (i.e., network 100), and thus the agent application appears as the selected device on the target domain (i.e., network 116). This is illustrated in FIG. 2A which shows a data store 202 present on network A appearing as a virtual data store 202v on network B, and a UPnP device 210 on network B appearing as a virtual UPnP device 210v on network A.

Figure 2A:
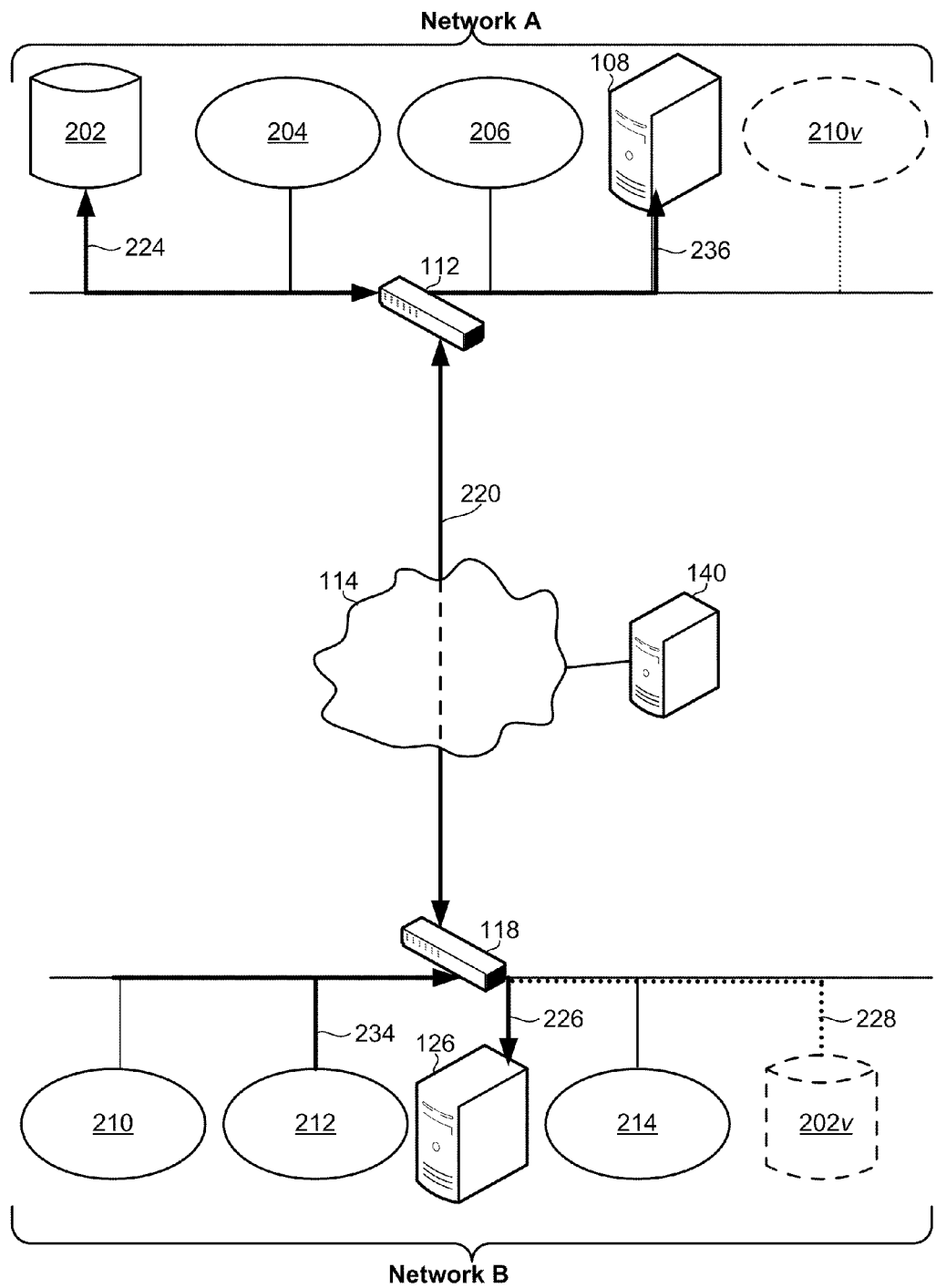
FIGS. 2A-2C are communication system block diagrams illustrating functionality of various embodiments.

This operation may be illustrated by way of an example with reference to FIG. 2A. A first user (user A) may access and sign into the registration server 142 from a cell phone mobile device 136, via a browser connecting to the Internet 114 via a wireless data network 130. In a webpage generated by the registration server 142, user A can see his own domains (e.g., network A), along with identifiers of his friends (e.g., user B) and his friends' domains (e.g., network B). The webpage may also display a list of all UPnP devices in his own domain (network A), or such a list may be displayed when user A selects a source domain. Using a user interface within the displayed webpage user A may select the network B of his friend user B as a target domain. User A may then select his domain (network A) as the source domain and receive a display of the UPnP devices on the source domain.

Using a user interface including this listing of devices, user A may select his media store 202 for virtualization. In this example, the media store 202 is a UPnP media server which contains two UPnP services (ContentDirectory:1 and ConnectionManager:1). Using the user interface hosted by the registration server 142, user A chooses to virtualize his media store 202. As described above, this selection causes the agent application running on the computer 108 in network A to send the device description and service descriptions of the media store 202 to the agent application running on the computer 126 in the target network (i.e., network B). On receipt of this message, the agent application in network B sends out UPnP advertisement messages on network B based on the received device description and service descriptions. In these UPnP advertisement messages the agent application sets the control URL in the device description to point to itself. In this way, other UPnP devices in network B are "fooled" into believing that the media store 202v is actually present in network B, as illustrated in FIG. 2A. Any device on the target network B can access the services and files of the virtualized media store 202v just as if the device were actually on network B. However, all interactions that devices have with the virtualized media store 202v will actually be sent to the agent application running on the computer 126 in network B, since the agent was specified in the location URL in the UPnP device advertisement messages.

In the UPnP protocol, once a UPnP device has been discovered by another UPnP-capable device, the services within the selected device may be located and used. This may be accomplished, for example, by obtaining a service description via HTTP and performing interactions using the SOAP protocol over HTTP to a URL specified in the device description (the control URL). Through the service descriptions, UPnP-capable devices are able to "understand" the services and UPnP actions available within a discovered device, the parameters such services and actions needed as input, and the form of results that will be returned by such services and actions.

In the various embodiments, once a virtualized UPnP device (e.g., virtualized media store 202v) has been announced on a network (e.g., network B), other devices 126, 210, 212, 214 on the network can attempt to obtain the device description and service descriptions for that device via HTTP GET requests to the specified URL, which is a URL to the agent application running on the computer 126. The agent application contains a simple HTTP server to handle such requests as if it were an actual device, and to return the device and service descriptions for the virtualized device 202v to the calling UPnP devices 126, 210, 212, 214. In this manner, for example, a UPnP device 212 in network B, such as a media player, is able to obtain the device and service descriptions for the virtualized media store 202v, which match those of the actual media store 202 in network A. In this example, the control URL in the service description will point to the agent application running on the computer 126 in network B, and therefore all requests for services will be made to the agent application and not the actual device 202 in network A.

When a device (e.g., media player 212) makes a call 234 to the "virtual" services provided by a virtualized device (e.g., virtualized media store 202v), the agent application in computer 126 accepts the inbound SOAP request, parses the input parameters, tests that it is valid against both the virtualized device and service descriptions, and then sends a request control message 220 addressed to the endpoint in the agent application in the source network (e.g., the agent application running in computer 108 in network A, for example). This request control message is passed over the peer-to-peer network 128 via the super-peer networking server 140 which relays the message to the IP address of the agent application running on the computer 108 in the source network A. This request control message includes details of the UPnP device, service, action, and input parameters that were called on the virtualized device. The agent application in the computer 108 in the source domain (e.g., network A) receives and unpacks the request control message. Using the UUID contained in the received request control message, the agent application locates the correct device (e.g., media store 202) on the local network (i.e., network A), sends a SOAP request 224 to the control URL of the UPnP device in the source network service with the appropriate action and parameters as obtained from the control message. The source device (e.g., media store 202) in network A responds to the SOAP request by sending a response message 236 to the agent application in the computer 108 in network A. The agent application receives the response message, packs this response message into a response control message and sends this response control message 226 back to the endpoint of the request control message, which is the agent application running on the computer 126 in the target domain network B. As with the request control message, the response control message 226 is sent over the peer-to-peer network via the super-peer networking server 140 which relays the message to the IP address of the agent application running on the computer 126 in the target network B. The agent application running on the computer 126 in the target network B unpacks the response control message 226, and replies to the original SOAP request from the requesting device 212 in network B using the received result parameters. Thus, the calling device 212 in network B appears to be able to call on a virtualized device 202v and service in network B created by the agent application (shown as dashed line 228), while the calling device 212 is actually served responses from the real UPnP device in network A.

Figure 2B:
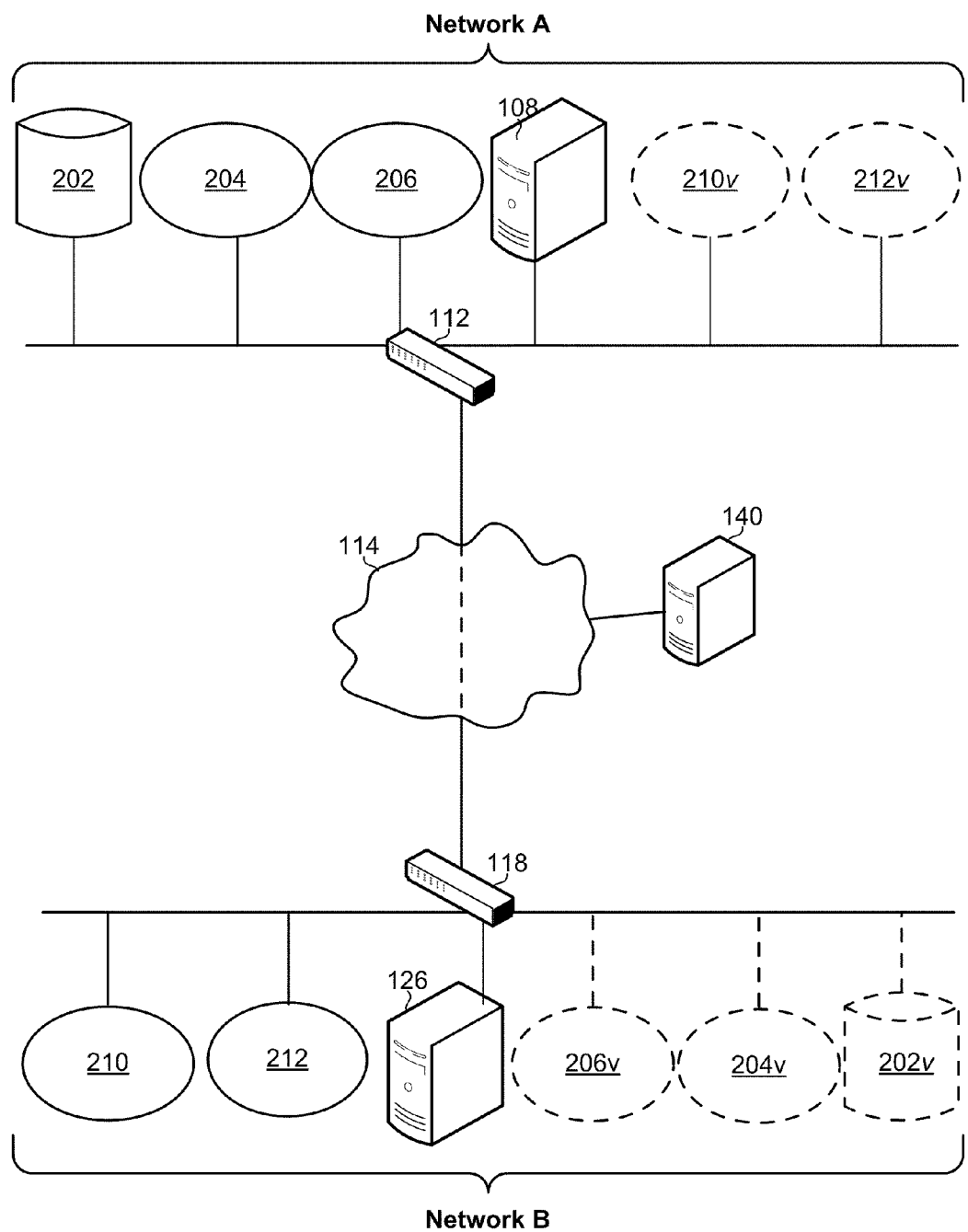

In addition to virtualizing a single device or service, these methods may be expanded or implemented so that when two users have linked their respective networks together, their networks appear to include both their own UPnP devices and virtual representations of UPnP devices on the other user's network, as illustrated in FIG. 2B.

The UPnP Forum (http://www.upnp.org) has also created a method for media devices to communicate between one another using UPnP protocols and standards. To this end the UPnP protocol defines several UPnP device types (e.g. Media Server) and services (e.g. ContentDirectory:1 and AVTransport:1). However, conventional UPnP protocol limits such communication to a local network and does not enable communication to external networks via the Internet.

In conventional UPnP networks, media players may call a UPnP action named "browse," defined in the service template in ContentDirectory:1 to locate items of media within a real source device. Once a desired media item has been located, the UPnP protocol specification requires that the content directory return an XML-based description of the media item in a format called DIDL-Lite. The DIDL-Lite definition includes an element called 'RES' or resource. The value of this RES element is a URL pointing to the location of the media to be played by the requesting device. In a normal subnet, this URL would point to the source device providing the ContentDirectory:1 service, with some parameters identifying the media item itself. A requesting media player would then connect to this URL and read from it to obtain the data that makes up the media item (for example an MP3 file).

In a further embodiment, URL mapping is performed which enables media streaming from a real source device in the source network to a requesting device in the target network without passing the data through the peer-to-peer network. In the case where a virtualized device is supporting ContentDirectory:1, and thus the actual media item is located in a remote source network (e.g., network A), the RES URLs are rewritten to point to a correct location in the target network (e.g., network B) where the media can be found. To do this, an agent application running in a computer 108, 116 in either the source or target networks employs several techniques to carry out this URL rewriting, and to thereby optimize the delivery of content from the source device in the source network to a requesting device in the target network.

When the agent application starts up in a local network computer 108, 116, it uses multicast domain name service (mDNS), which is another standard protocol for network service discovery, to locate Internet Gateway Devices (IGDs) capable of supporting network port forwarding. If a device, such as an Internet gateway coupled to the router 112, 118, is found which does support port forwarding, the agent application obtains the external IP address from the IGD (that is, the IP address of the local network 100, 116 as seen on the public Internet) and creates a port forward on this device to the agent application running in the computer 108, 116. The details of this port forward are held in the agent application and passed to the agent application in the target network (e.g., network B) in subsequent control messages. When a RES element is generated by an agent application acting as a virtualized ContentDirectory:1 service as a result of a 'browse' action by a media player (i.e., the agent application running on the computer 116 in the target network), the RES element is modified by the agent application to point back to the agent application that maintains an HTTP server specifically for this purpose. Media data is then transferred between the agent applications running in the computers 108, 126 in the source and target domains, but the RES URLs are rewritten with additional information so that media data are transmitted via the Internet 114, as opposed to using the peer-to-peer messaging network 128. The manner in which the RES URLs are rewritten depends upon the port forwarding capabilities of the source and target networks as described below.

If the source domain network supports port forwarding, the media source URL is encoded such that requests from a media player to the target network agent application (e.g., the agent running in the computer 126 in network B) will be interpreted to allow the target client (e.g., a media player 212 in the target network B) to make HTTP read requests directly from the agent application in the source domain without going via the peer-to-peer messaging network. Thus, the HTTP read request will be addressed to the agent application running in the computer 108 in the source network A and be transmitted via the Internet 114 without passing through the super-peer networking server 140. This implementation is illustrated in FIG. 2A, which shows media data flowing via communication 220 through the Internet 114 between the agent applications running in the computers 108, 126 in the source and target domains (i.e., networks A and B), without passing through the peer-to-peer networking server 140. Thus, while the negotiations that enable accessing media in the source domain are accomplished via the peer-to-peer network, the transmission or streaming of the media data is accomplished directly between the agent applications in the source and target domains via the Internet.

If the source domain does not support port forwarding, but the target domain does, the agent application in the computer 116 in the target domain may encode the URL so that requests from the media player (e.g., a media player 212 in the target network B) to the target domain agent application (i.e., the agent application running in the computer 126 in the target network B) will cause a control message to be sent to the agent application running on the computer 108 in the source domain. This control message causes that agent application to push media data directly to the target domain via the Internet without utilizing the peer-to-peer messaging network. Thus, an HTTP read-request will be transformed into a control message that causes the agent application in the source domain to obtain the requested media from the media source (e.g., media store 202) and to push the obtained media data to the agent application in the target domain via the Internet 114. The agent application in the target domain then receives the media and provides it to the requesting media player as if the agent application was the media source. This implementation is also illustrated in FIG. 2A, which shows media data flowing via communication 220 through the Internet 114 between the agent applications running in the computers 108, 126 in the source and target domains (i.e., networks A and B) without passing through the peer-to-peer networking server 140. Again, while the negotiations that enable accessing media in the source domain are accomplished via the peer-to-peer network, the transmission or streaming of the media data is accomplished directly between the agent applications in the source and target domains via the Internet.

Figure 2C:
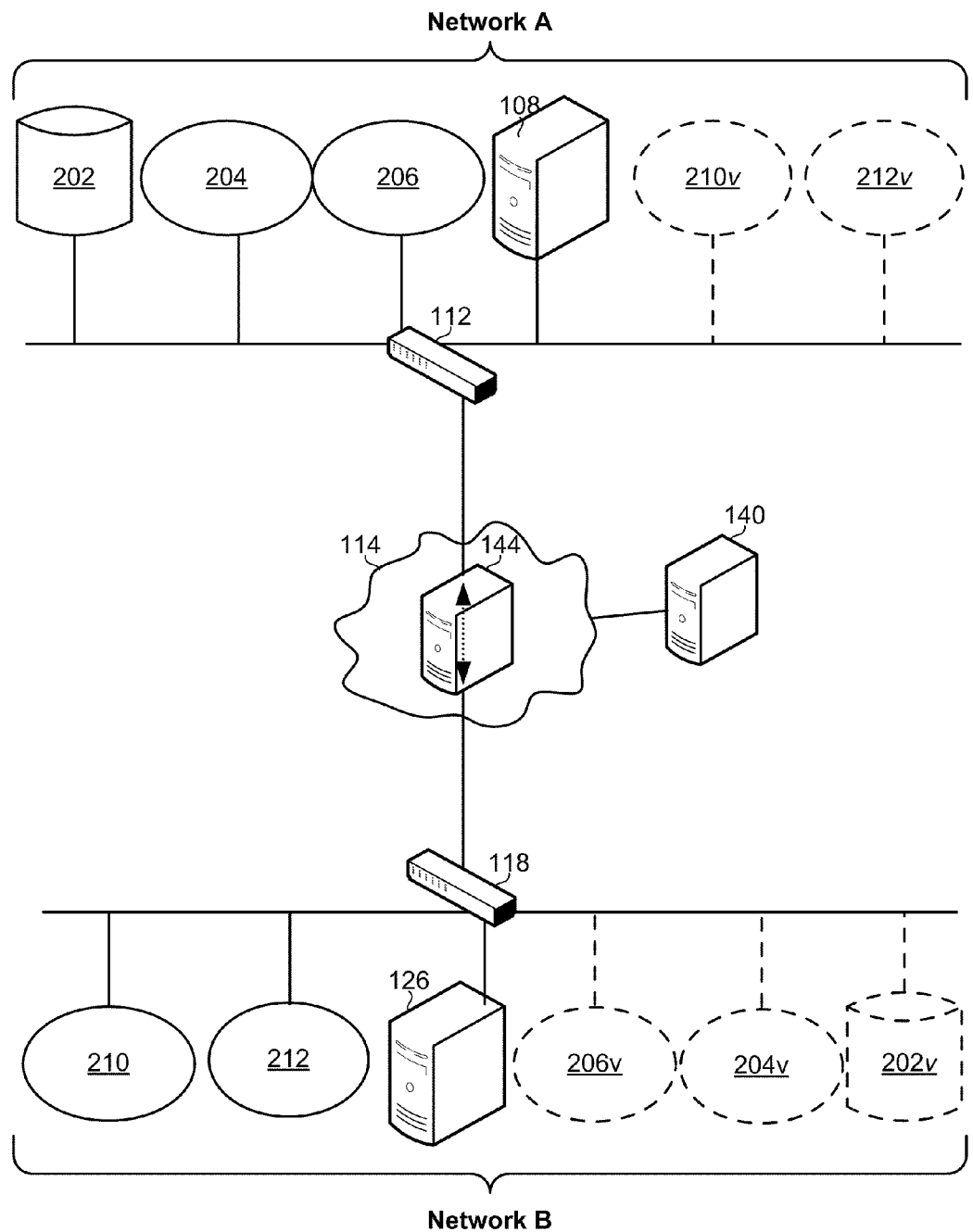

If neither the source nor the target domains support port forwarding, then the agent application running in the computer 126 in the target domain sends a control message to the agent application running in the computer 108 in the source domain, which instructs the source agent application to obtain and push the requested media data to an intermediary relay server (referred to herein as the re-routing server 144) that exists on the Internet 114. This re-routing server 144 acts as an efficient data buffer, allowing uploads and downloads of data to occur. At about the same time, the agent application running in the computer 126 in the target domain accesses the same re-routing server 144, and starts reading the media data from the buffer created by the re-routing server 144. The control message from the target domain agent application to the source domain agent application may be transmitted over the peer-to-peer network via the peer-to-peer networking server 140; however, the subsequent media data transmissions are communicated via the re-routing server 144, thereby bypassing the peer-to-peer network. This implementation is illustrated in FIG. 2C, which shows media data flowing through the Internet 114 via the re-routing server 144 located within the Internet between the source and target domains (i.e., networks A and B) without passing through the peer-to-peer networking server 140. Thus, while the negotiations that enable accessing media in the source domain are accomplished via the peer-to-peer network, the transmission or streaming of the media data is accomplished between the agent applications in the source and target domains through the re-routing server 144 via the Internet.

Regardless of the particular URL mapping performed, the media player reads the requested media data from the agent application in the target domain and renders the data (e.g., plays a song, or displays a video) just as if it were reading the media data from a UPnP device on its local network (e.g., network B).

Figure 3:
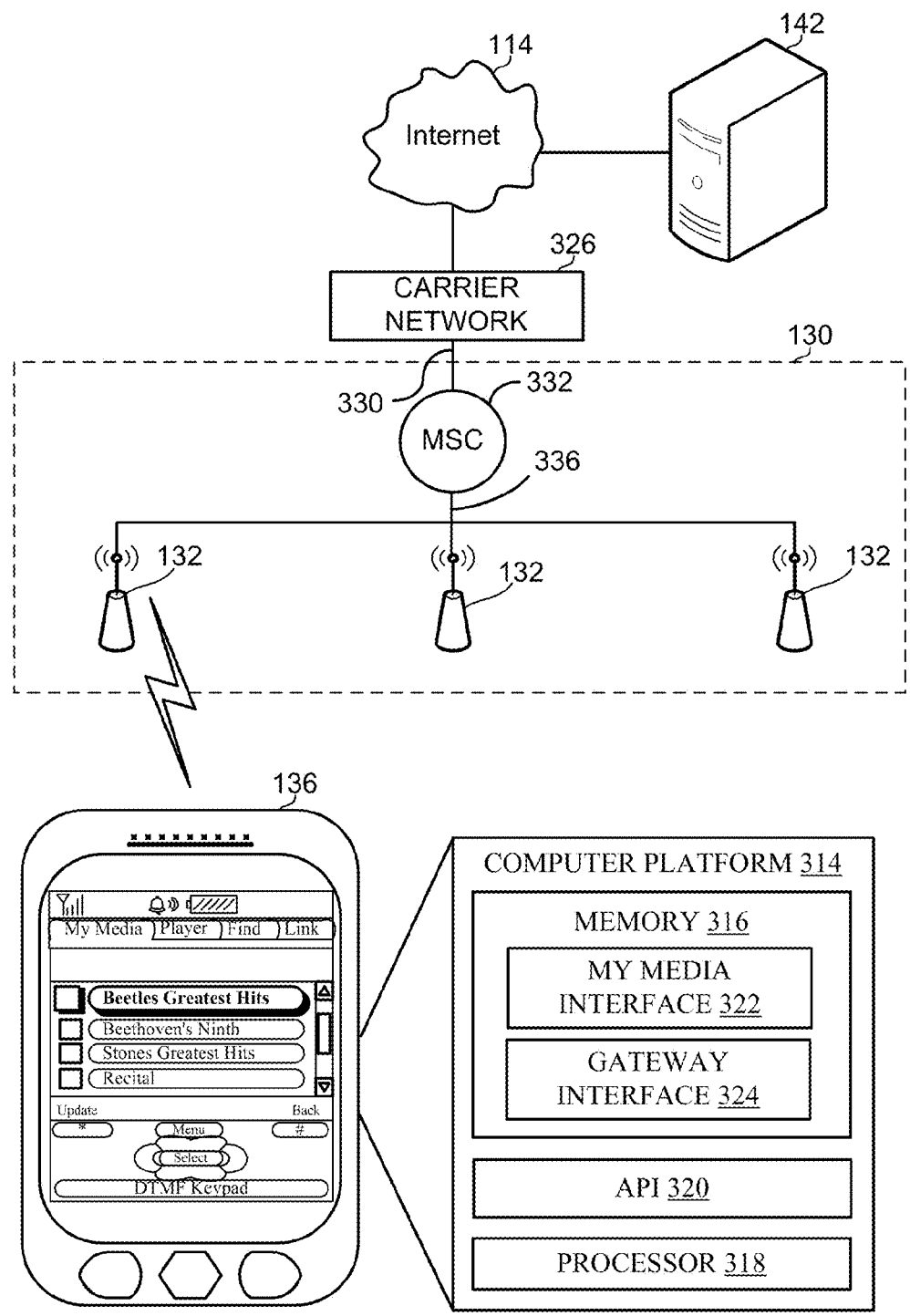
FIG. 3 is a communication system block diagram illustrating components in communication with a mobile device for use with various embodiments.

As mentioned above, users may initiate the virtualization process to make devices and services available on their domains (e.g., network A) from any computing device with access to the Internet 114, including mobile devices 136. This capability provides users with the ability to have access to their media files without the need to carry media stores with them; provided they have their cellular telephone with them, users can direct their media to any UPnP device on an available network Some of the components of the communication system that enable controlling network and device accesses on a mobile device 136 are illustrated in FIG. 3. To enable a mobile device 136 to access the Internet 114, and through the Internet to access the registration server 142, the mobile device 136 may communicate with a wireless network 130. The wireless network 130 may communicate with the Internet 114 via a carrier network 326 through a data link 330, such as the Internet, a secure LAN, WAN, or other network. The carrier network 326 controls messages (generally consisting of data packets) sent to a mobile switching center (MSC) 332, and communicates with the MSC 332 to transfer data and voice information. The MSC 332 may be connected to multiple base stations (BTS) 132 by another network 336, such as a data network and/or Internet portion for data transfer and a POTS portion for voice information. A BTS 132 wirelessly broadcasts messages to and receives messages from the mobile devices 136, using predetermined voice and/or data packet services, such as Code Division Multiple Access (CDMA), short messaging service (SMS), or any other over-the-air methods.

Mobile devices 136 are configured to include a computer platform 314 having a memory 316 in communication with a processor 318, such as via an application programming interface (API) 320 that enables interaction with any resident applications, (e.g., a "my media" interface 322 that works cooperatively with information communicated by the registration server 142 shown FIG. 1).

Figure 4:
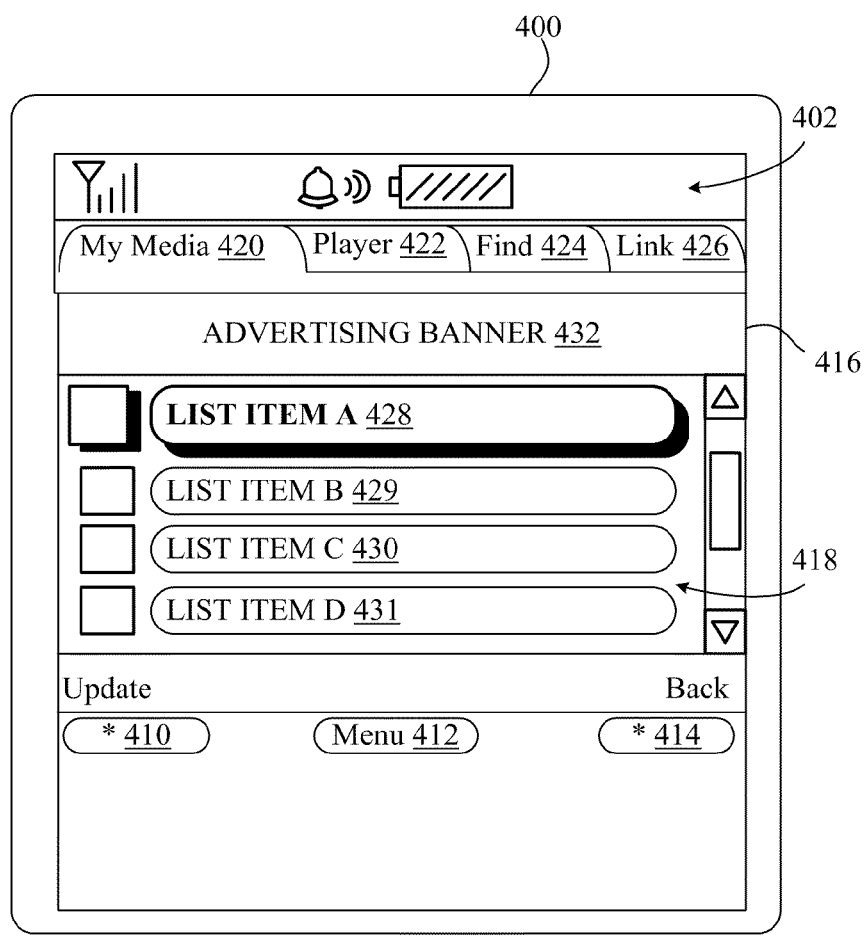
FIG. 4 depicts a user interface suitable for implementation on a mobile device for use with various embodiments.

FIG. 4 illustrates an example mobile device display 400 that provides a graphical user interface (GUI) 402 for remotely accessing and controlling personal media content for use with the various embodiments. Such a GUI 402 may include icons and shapes associated with functions which may be selected by pressing physical keys in a keypad that may be provided below the display 400, or by pressing the display itself when the display has touch screen capability. The GUI display 416 may include a personal media content index 418, which may be organized under a hierarchy of tabs such as a "my media" tab 420, a "player selection" tab 422, a "find media" search tab 424, and a "gateway" linking tab 426. For example, under the "my media" tab 420, the GUI may provide a plurality of available device or service list items A-D 428-431, such as a listing of media types (e.g., audio, video, images, etc.), artists, album titles, genres, playlists, song titles, etc. The display may include advertisement banners 432 that a provider of the services may implement, such as for media purchase opportunities or collateral services related to a media listing being depicted.

As mentioned above, when a user accesses the registration server 142 to make devices or services available on a target domain, the registration server 142 may generate a list of such devices or services which the mobile device may present on a GUI display 402 (e.g., list items A-D 428-431). Using the GUI functionality, the user may select a particular friend domain as a target domain, a particular listed user domain as a source domain, and a particular device or service to be virtualized on a target domain.

Figure 5:
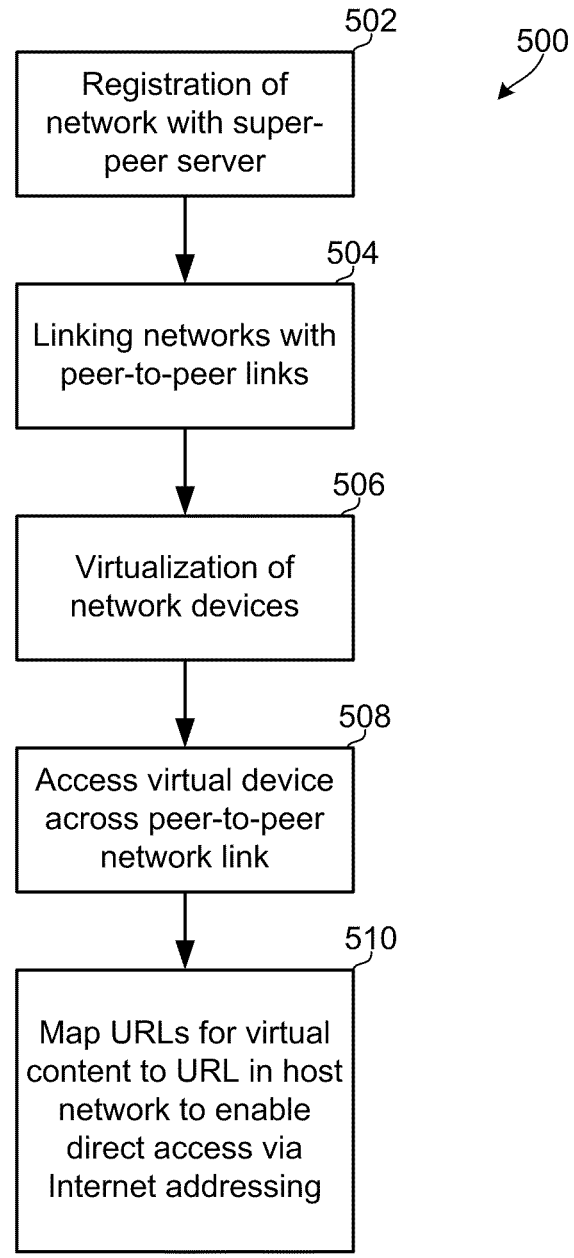
FIG. 5 is a process flow diagram of an overview process of various embodiments.

An overview of the processes involved in the various embodiments is illustrated in FIG. 5 which shows method 500. When a user decides to register a local network for sharing via the various embodiments, the user may access a registration server 142 by connecting to it via the Internet 114, step 502. As part of registering for the service, the user may be prompted to provide identifying information that the registration server can use in the future to confirm the user's identity. Also as part of this process, the registration server may download the agent application to a computer on the user's network. Once registered with the service, a user may invite friends and colleagues to link their local networks with peer-to-peer communication links, step 504. This process is very similar to a social networking process in which users identify friends and invite others to join their peer-to-peer networks. Once users have identified each other as friends, a user may select a target network for sharing devices and services by identifying that network via the registration server 142. Once the user has identified the target and source networks for sharing media, the user may initiate the process of virtualizing selected devices or services on the target network, step 506. UPnP devices on the target network may then access a virtual device or service via the peer-to-peer network link, step 508. When a media player device on the target network accesses a media file on the source network, the agent applications on computers 108, 126 on the source and target networks cooperate to map media data URLs or virtual content to a URL that enables direct access of the media via the Internet without transmitting the data via the peer-to-peer network link, step 510.

Figure 6:
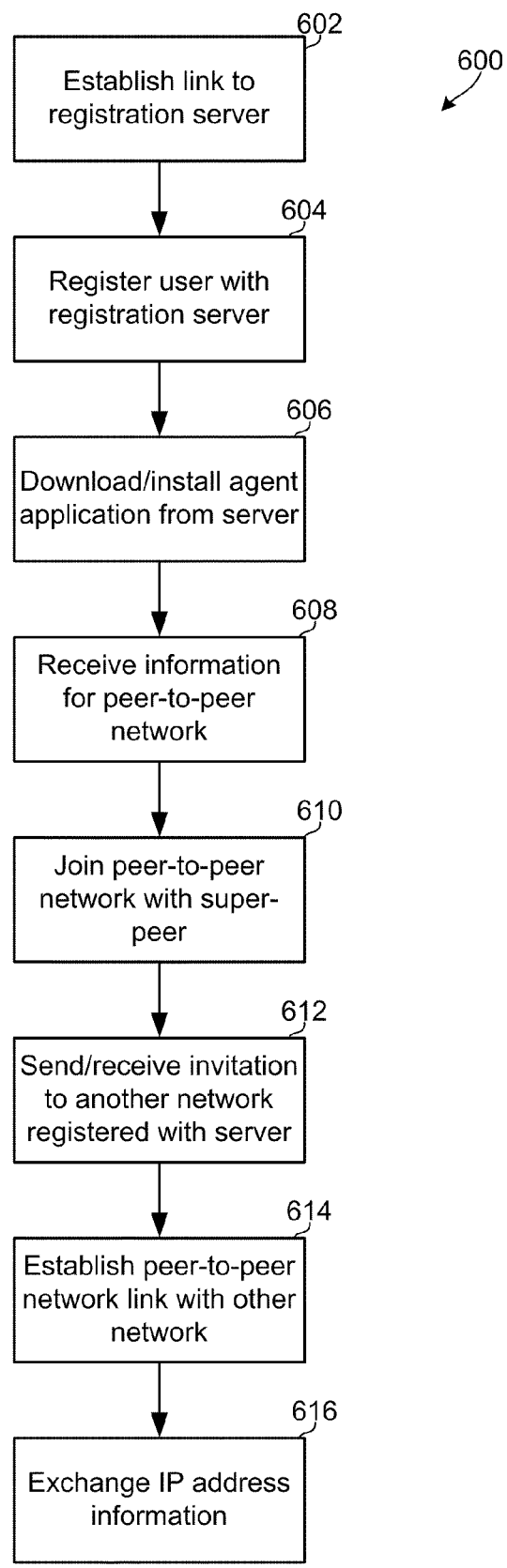
FIG. 6 is a process flow diagram of an embodiment method for registering a network to establish a peer-to-peer network for use with various embodiments.

An example embodiment method 600 for registering with a registration server 142 is illustrated in FIG. 6. To initiate the registration process, the user establishes a computer link to a super-peer registration server 142, step 602. The user may be prompted to enter information about themselves as required to create a user account, including information sufficient to enable the registration user to confirm the identity of the user in the future, step 604. Such information may be stored in a user account database. The registration server may also download an agent application to the computer on the user's network and cause that application to be installed, step 606. As part of this process, the registration server may provide the user with a unique domain ID and store the user's domain ID along with the IP address for the computer on the user's network in the user account database. Using this information, the super-peer networking server 140 can address control messages to the user's computer and its agent application based upon receiving the user's domain ID. Thus, the domain ID serves as a public address for the user's computer and its agent application that the super-peer networking server 140 can use to redirect control messages to the appropriate IP address.

Once a user has registered with the registration server, the user can join peer-to-peer networks via the super-peer networking server 140, step 610. To establish a peer-to-peer link with another network, the user may access the registration server 142 to identify other networks and to send or receive an invitation to such other networks to form a peer-to-peer network, step 612. When two networks have exchanged invitations and the users have agreed to link their respective networks, they can begin sending control messages to one another via the peer-to-peer network established through the super-peer networking server 140, step 614. In order to enable the downloading of media from one network to another, the agent applications running on the computers 108, 126 in the users' respective networks may exchange their external IP address information as may be obtained from port forwarding operations as described above, step 616. At this point, the two networks can begin sharing devices and services, as described more fully below with reference to FIG. 8.

Figure 7:
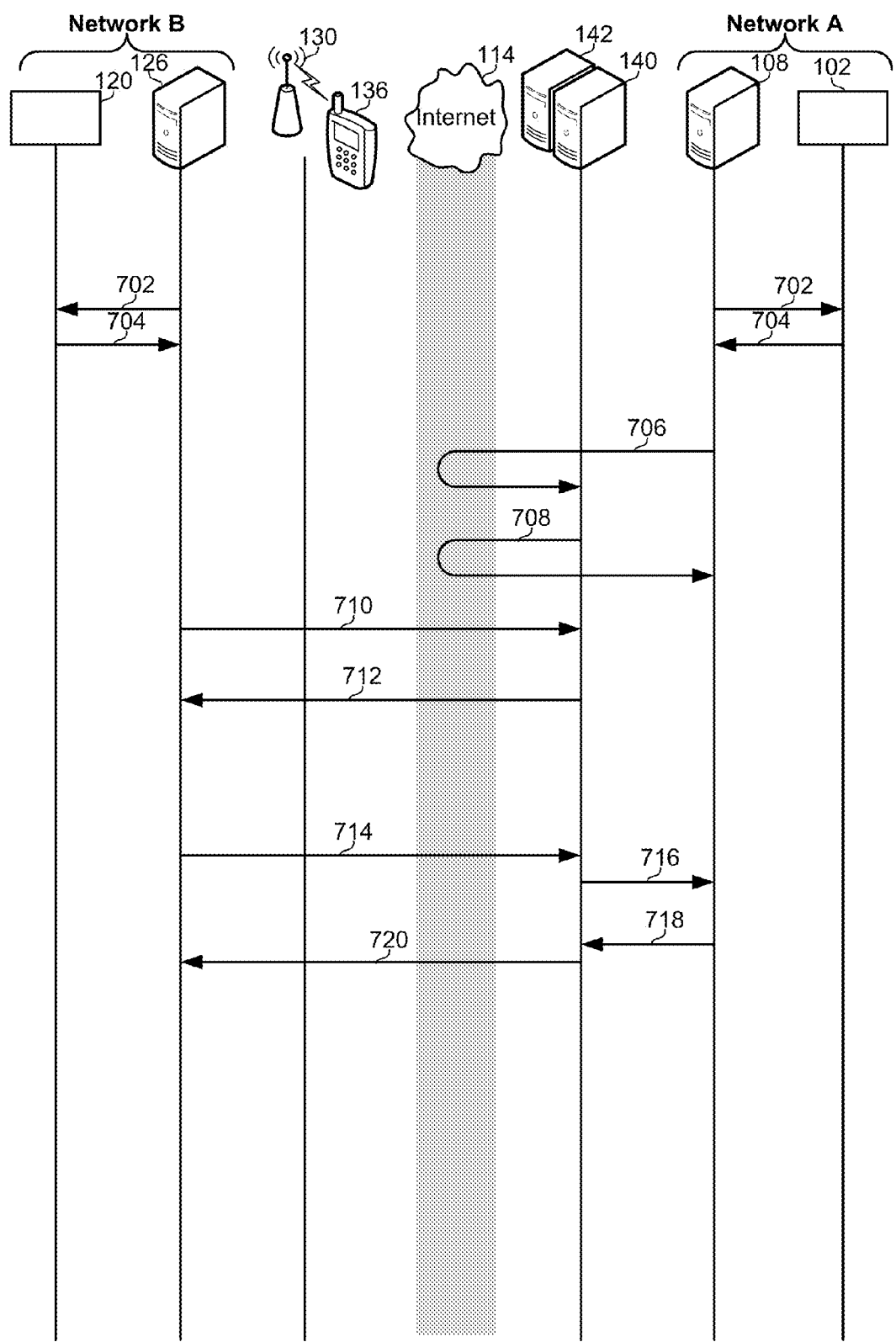
FIG. 7 is a message flow diagram illustrating messages that may be exchanged among various components in the embodiment method illustrated in FIG. 6.

FIG. 7 illustrates messages that may be exchanged among components within the communication system and of the various embodiments as part of the registration process described above with reference to FIG. 6. As described above, when the computer 108, 126 and a network are started and the agent application is initiated, the agent application may discover the UPnP devices 102, 120 within its network by requesting such devices to announce their presence, messages 702, and by listening to UPnP device advertisement messages, messages 704.

To register a network with the registration server 142, a user may access a website hosted by the registration server 142, messages 706. As part of the registration process, the registration server 142 downloads the agent application to a computer on the local network, message 708. Similarly, when another user registers with the network, and they also access the website hosted by the registration server, message 710, and receive a download of the agent application, message 712. Sometime later, one user may send an invitation to the other user to join in a peer-to-peer link, which may be transmitted as an invitation message to the peer-to-peer routing server 140, message 714, which the peer-to-peer routing server 140 forwards on to the computer 108 in the invited network, message 716. This networking invitation may be accepted in a message 718 that the peer-to-peer routing server 140 forwards to the inviting computer, message 720.

Figure 8:
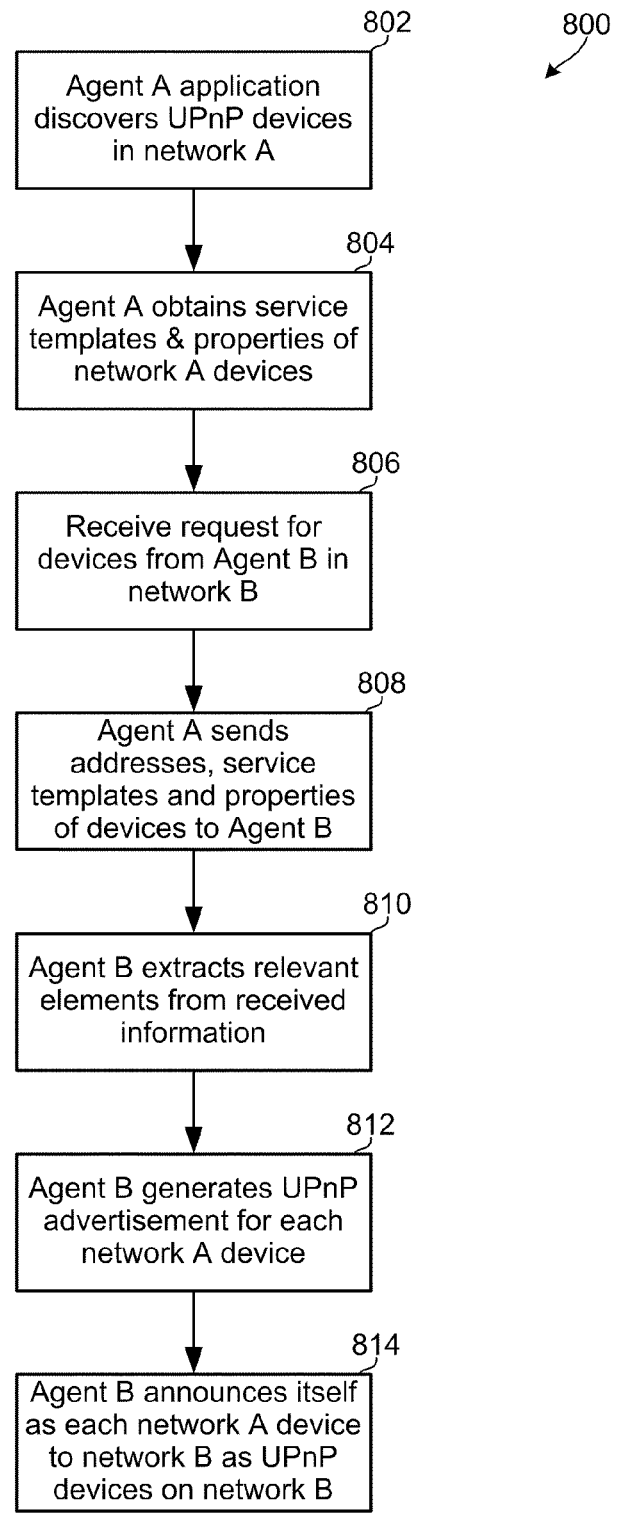
FIG. 8 is a process flow diagram of an embodiment method for virtualizing a device on a first network so that it may appear as a virtual device on a second network.

An example process 800 by which devices and services available on a first network (network A) may be virtualized on a second network (network B) is illustrated in FIG. 8. As described above, the agent application running on the computer 108 in network A (referred to in the drawings as agent A) may discover the UPnP devices connected to network A, step 802. As mentioned above, this may be accomplished by monitoring device advertisement messages or by periodically querying devices on the network. As part of this process, the agent application may also obtain the service templates, properties, and addresses of the UPnP devices on the network, step 804.

When a user seeks to make a device or service on the user's network available to another network (such as by implementing processes described below with reference to FIGS. 10 and 11), a registration server 142 may send a control message to the agent application in network A requesting the agent to send information regarding a particular device or all devices to the agent application in network B (referred to as agent B), step 806. In some implementations, the request for devices may be received from the agent application in network B via the peer-to-peer network enabled by the super-peer networking server 140. It should be noted that the step 804 of obtaining device names, service templates, and properties may be performed in response to receiving a request for such information for particular devices, step 806. The agent application running in network A then sends the device addresses, service templates, and properties of devices and services (or selected devices) in network A to the agent application in network B, step 808. The agent application in network B then extracts relevant elements from the received device information, step 810, and generates UPnP device advertisement messages for each network a device or service for which information was received, step 812. The process of generating a UPnP device advertisement message follows the UPnP protocol requirements so that the advertisement message can be understood by conventional UPnP devices. The process of generating the UPnP device advertisement message uses the agent application URL as the URL for the device being announced to the network. The agent application in network B then transmits the UPnP device advertisement message on network B, thereby announcing itself as the UPnP device or devices of network A, step 814. This process thus creates virtual copies of the device or devices of network A on network B with those virtual devices having the same URL as the agent application on network B.

Figure 9A:
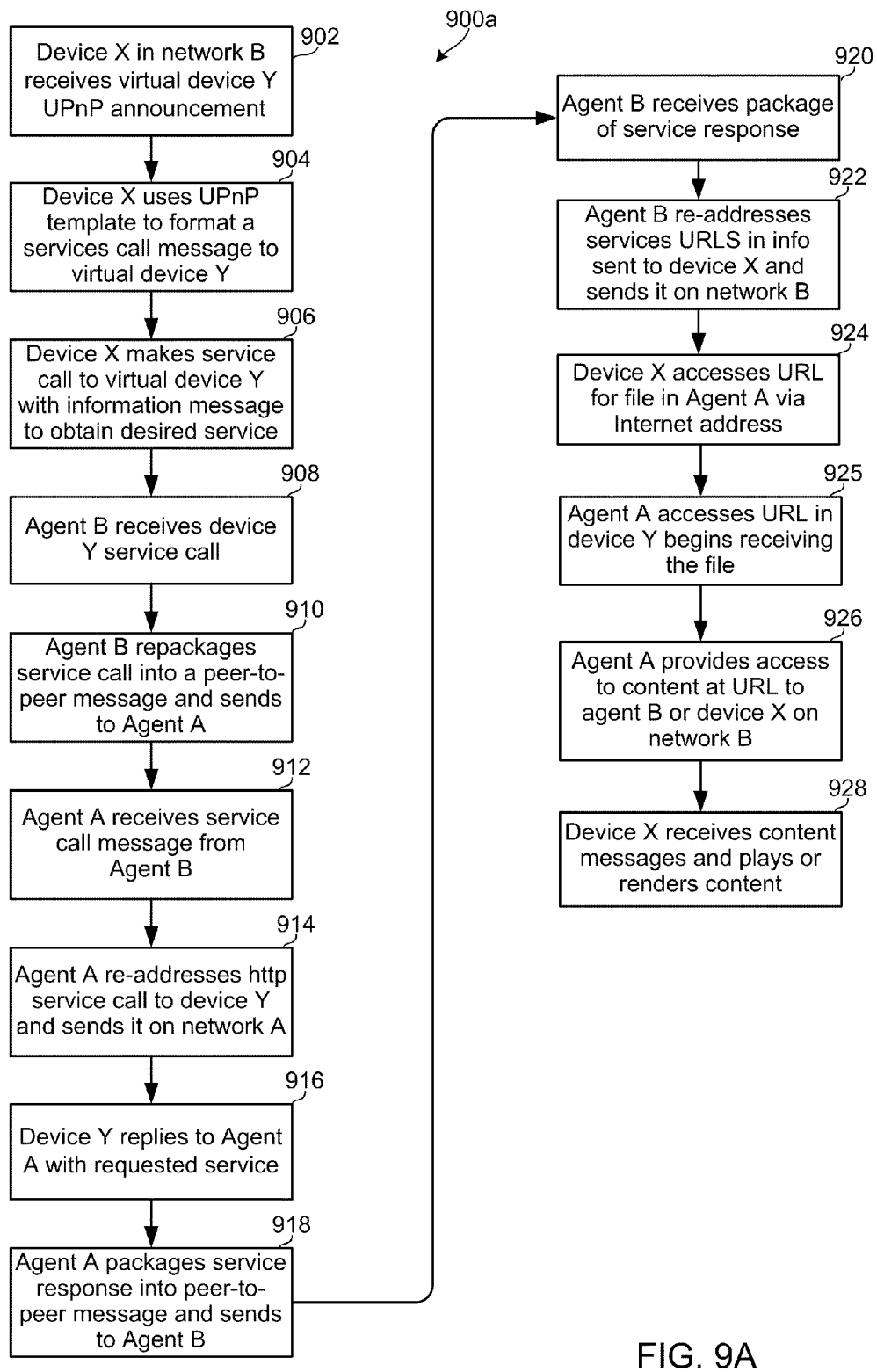

An example embodiment method 900a by which UPnP devices in a target network, such as network B, can access devices, services and media available in a source network, such as network A is illustrated in FIG. 9A. This example embodiment is applicable when the source network (e.g., network A) supports port forwarding. UPnP devices on network B will receive the device advertisement messages, such as for a "virtual device Y," as described above with reference to FIG. 8, step 902. A UPnP-capable device on network B, such as "device X," may use the information contained in the device Y advertisement announcement, including the information in the service templates, to format a services call message, such as an HTTP call, step 904. This service call message is sent on network B addressed to the URL of the virtual device Y which is the URL of the agent application in network B, step 906. This service call message may include a packet of information complying with the requirements specified in the device service templates in order to obtain the desired service (e.g., a directory of available files or services).

The agent application on network B receives the virtual device Y service call from device X, step 908. The agent application of network B then repackages this service call into a peer-to-peer message that it transmits to the agent application in network A via the super-peer routing server 140, step 910. The agent application in network A receives the service call message, step 912, re-addresses the service call to the actual device Y, and sends the service call on network A, step 914. The real device Y then replies to this service call, sending its response message to the agent application in network A including the requested service (e.g., a directory of available media files), step 916. The agent application in network A receives the response from the device Y and packages the service response into a peer-to-peer message that it sends to the agent in network B, step 918. As part of packaging the response message, the agent application in network A includes the external IP address for network A that was previously obtained using a port forwarding request.

The agent application in network B receives the service response message, step 920, and re-maps the service URLs within the information received from device Y to point to its own address but containing parameters which reflects the external IP address of the agent application in network A, before forwarding the service response information to device X in network B, step 922. Device X then may access the URL for a particular file available in virtual device Y, step 924. Since the agent application in network B is mapped as the received URL to the external IP address of the device Y in network A, the access by device X is to the agent application in network B. That agent application forwards the URL access request to the agent in network A via the Internet in step 924. In an alternative embodiment, the device X URL access may be forwarded directly via the Internet to the agent application in network A.

When the device Y in network A receives the URL access request, it begins providing content associated with that URL to the agent application in network A, step 925. The agent application in network A may buffer the data and provides access to the media data to the agent application in network B which begins receiving and buffering the media data without passing through the peer-to-peer network or the super-peer networking server 140, step 926. In an alternative embodiment, the agent in network A may stream the media data directly to the device X in network B without passing through the peer-to-peer network. Device X in network B then begins to render the content, such as playing the received media, step 928. In some embodiments, media data may be buffered by the agent application in network B to facilitate continuous flow of media data to the device X. In a further embodiment, the URL mapping provided by the agent applications in the source and target networks may enable the requesting device X in network B to directly access the source device Y in network A.

Figure 9B:
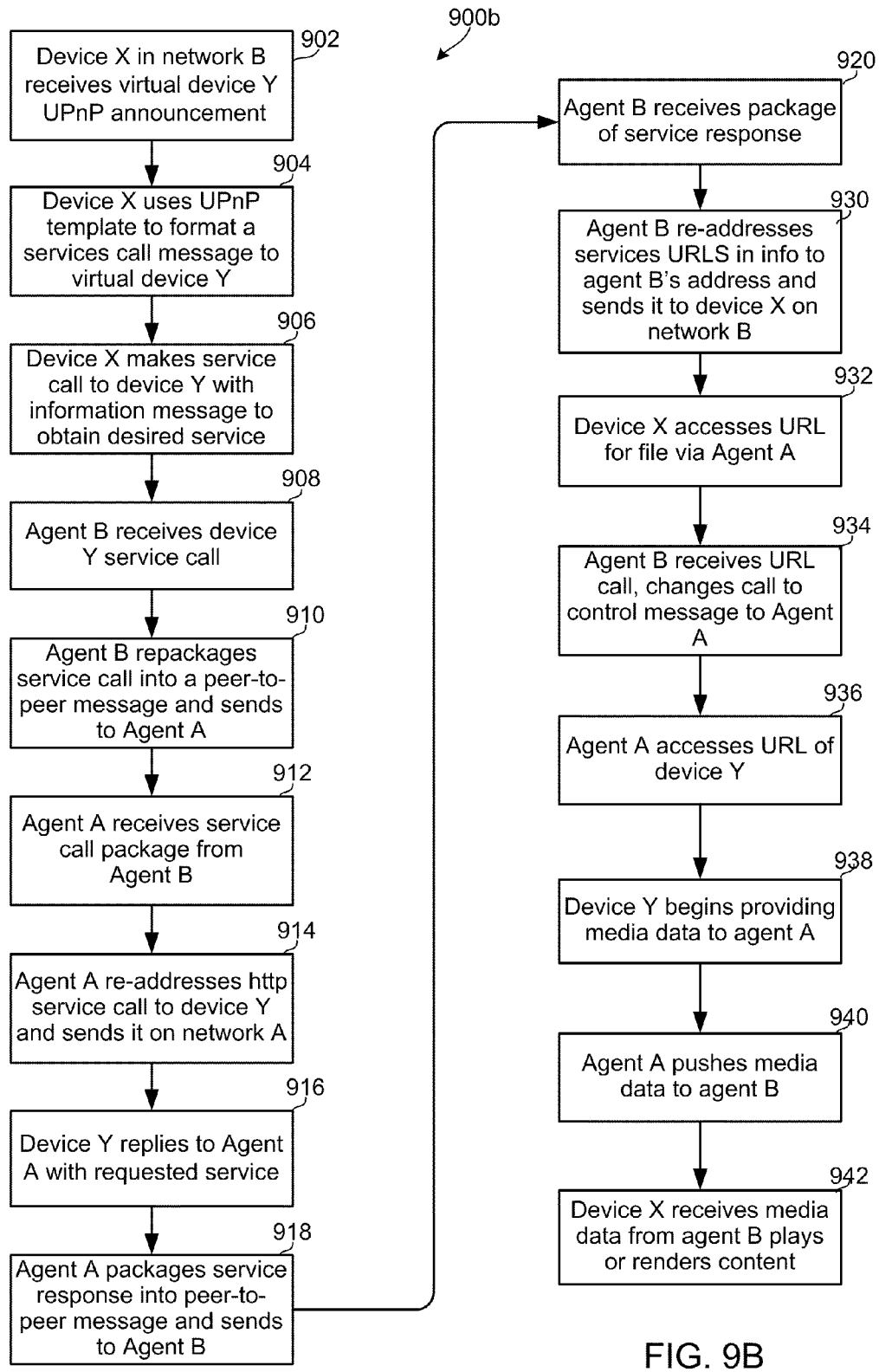

Another example embodiment method 900b by which UPnP devices in a target network (e.g., network B), can access devices, services and media available in a source network (network A) is illustrated in FIG. 9B. This example embodiment is applicable when the source network (network A) does not support port forwarding, but the target network (network B) does support port forwarding. In this example embodiment, the process by which a device X in network B can discover media available in a device Y in network A is substantially similar to that described above with reference to FIG. 9A until the agent application in network A packages the service response message for transmission to the agent application in network B, step 918. Since network A does not support port forwarding in this embodiment, the service response message provided by the agent in network A does not include the external IP address for network A. The service response message is received by the agent in network B, step 920. Since network B in this embodiment supports port forwarding, the agent application in network B may encode the URL for device Y to be that of the agent application in network B, and forwards the service response message to device X on network B, step 930. When device X accesses a URL for the virtual device Y, step 932, this message is received by the agent application in network B which transforms the access request into a control message that is sent via the peer-to-peer network 128 to the agent application in network A, step 934. This control message includes the external IP address of network B. The control message causes the agent application in network A to access the URL of the real device Y and receive the media data, step 936. Device Y receives the URL access and begins providing the media data to the agent application in network A which may buffer the received data, step 938. The agent application in network A then pushes the media data to network B via the Internet using the external IP address received in the control message, step 940. In a first embodiment, the agent application in network A pushes the media data via the Internet to the agent application in network B, step 940. The agent application in network B receives the media data and provides it to the requesting media player, device X, as if the agent application was the media source. Device X in network B then begins to render the content, such as playing the received media, step 942. The received media data may be buffered by the agent application in network B to facilitate continuous flow of media data to the device X. In an alternative embodiment, the media data may be pushed directly to the IP address of the media player (i.e., device X).

Another example embodiment method 900c by which UPnP devices in a target network (network B) can access devices, services and media available in a source network (network A) is illustrated in FIG. 9C. This example embodiment is applicable when neither the source nor the target networks support port forwarding. In this embodiment, the process by which a device X in network B can discover media available in a real device Y in network A is substantially similar to that described above with reference to FIG. 9A, until the agent application in network A packages the service response message for transmission to the agent application and network B, step 918. Since network A does not support port forwarding, the service response message provided by the agent in network A does not include the external IP address for network A. The service response message is received by the agent in network B, step 920. Since the target network B also does not support port forwarding, the agent application in network B may encode the URL for device Y to be that of the re-routing server 144, and forwards the service response message to device X on network B, step 950. When device X accesses a URL for virtual device Y, step 952, this message is received by the agent application in network B which transforms the access request into a control message that is sent via the peer-to-peer network to the agent application in network A, step 954. This control message causes the agent application in network A to access the URL of device Y, step 958, which begins providing the media data to the agent application, step 960. The control message also causes the agent application in network A to begin pushing the media data to the re-routing server 144, step 962. The agent application in network B may also send a control message to the re-routing server 144 to cause it to begin receiving and buffering media data from network A, 956. At about the same time, the agent application in network B may access the re-routing server 144 and start reading media data from the buffer in the re-routing server 144, step 964. Device X in network B then accesses the media data from the agent application in network B and begins to render the content, such as playing the received media, step 966. The agent application in network B may buffer the media data to facilitate continuous flow of media data to the device X.

Using the user interface tools provided by a website hosted by the registration server 142, the user may select or identify a source network (e.g., network A), and a target or destination network (e.g., network B), step 1003. Having identified the source network, the user may request a menu of devices, services or media available on the source network, step 1004. The registration 142 receives the user's requests and sends a control message to the agent application in network A requesting a listing of devices, services or media, step 1006. This control message may be sent via the peer-to-peer network through the super-peer networking server 140. The agent application in network A may reply with a list of devices that it has discovered on network A, step 1008. The registration server receives this information and generates an information message or webpage that lists the devices, services or media, step 1010, which is transmitted to the mobile device via a wireless network, step 1012. The mobile device receives this message and displays the device list, which may be in the form of a user interface for receiving user selections, step 1014. If the user makes a selection, the mobile device receives this information and transmits the user's selection of a device, service or media to the registration server, step 1016. The registration server then sends a control message to the agent application in network A identifying the selected device, service or media, step 1018. Optionally as part of the step, the registration server 142 may also inform the agent application on network B that device, service or media information may be forthcoming from network A.

The agent application in network A receives the request to virtualize a selected device, service or media, step 1020, and obtains the device's address, service templates and properties, step 1022. The agent network A then formats the received information into a message that is transmitted to the agent application in network B via the peer-to-peer network (i.e., via the super-peer networking server 140), step 1024. This message is received by the agent application in network B, which extracts the relevant elements, step 1026, and generates a UPnP device advertisement message for the selected device, step 1028. As mentioned above, this device advertisement message includes a URL for the virtual device corresponding to the agent application on network B. The agent in network B then transmits the device advertisement message on network B, thereby announcing itself as the virtual device, service or media, step 1030. Once the advertisement message is sent on network B, devices on the network may access the virtual device, service or media as described above with reference to FIGS. 9A-9C.

Figure 11:
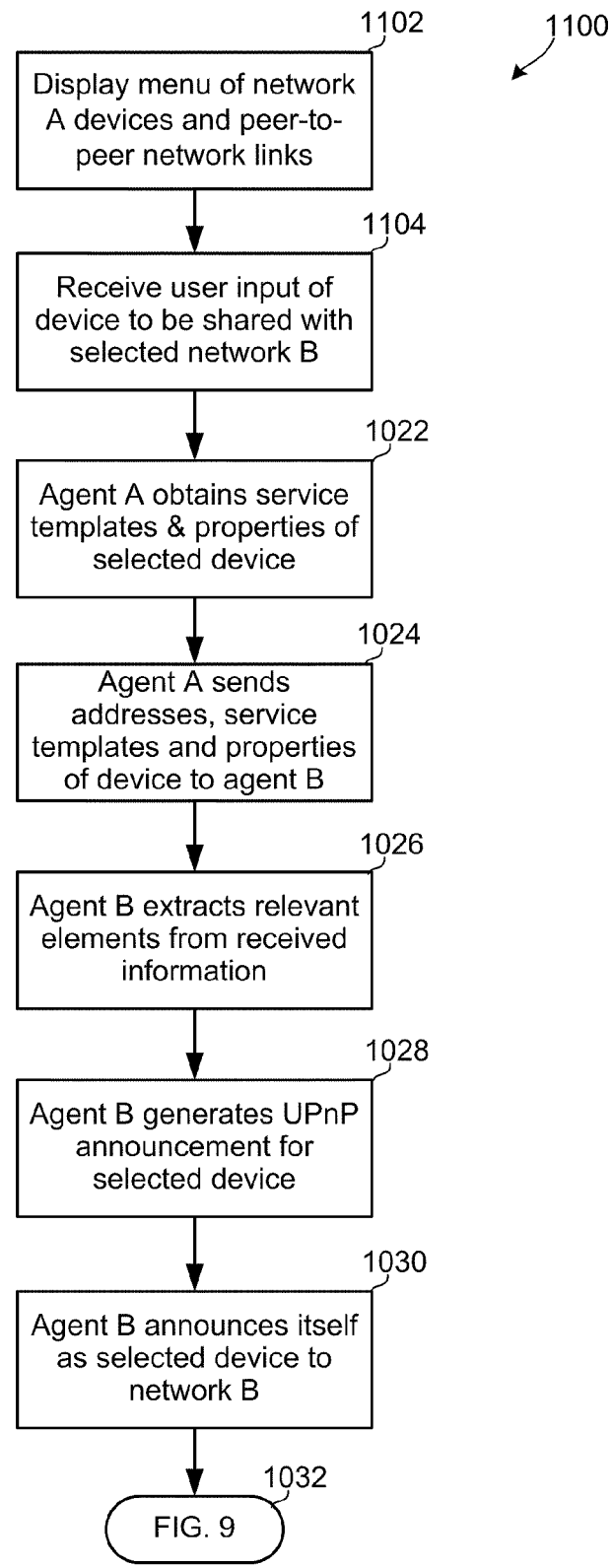
FIG. 11 is a process flow diagram of another embodiment method for using a computer on a first network to enable a device on the first network to be accessed as a virtual device on a second network.

The process of virtualizing a device, service or media may also be initiated from a computer on the source network (e.g., network A), an example embodiment method 1100 for which is illustrated in FIG. 11. Using a computer 108 on network A, a user may view a display of devices on the network as well as a list of peer-to-peer network links or "friend" networks to which the user may establish a link, step 1102. The computer 108 may receive a user input of a selected device to be shared with a selected target network B, step 1104. For example, the computer 108 may be configured with a graphical user interface that lists devices and networks and receives user inputs in the form of keystrokes or mouse clicks. With this information obtained from the user, the process may proceed as described above with reference to FIG. 10 for steps 1022 through 1030. Once the advertisement message is sent on network B, devices on the network may access the virtual device, service or media as described above with reference to FIGS. 9A-9C.

Figure 12:
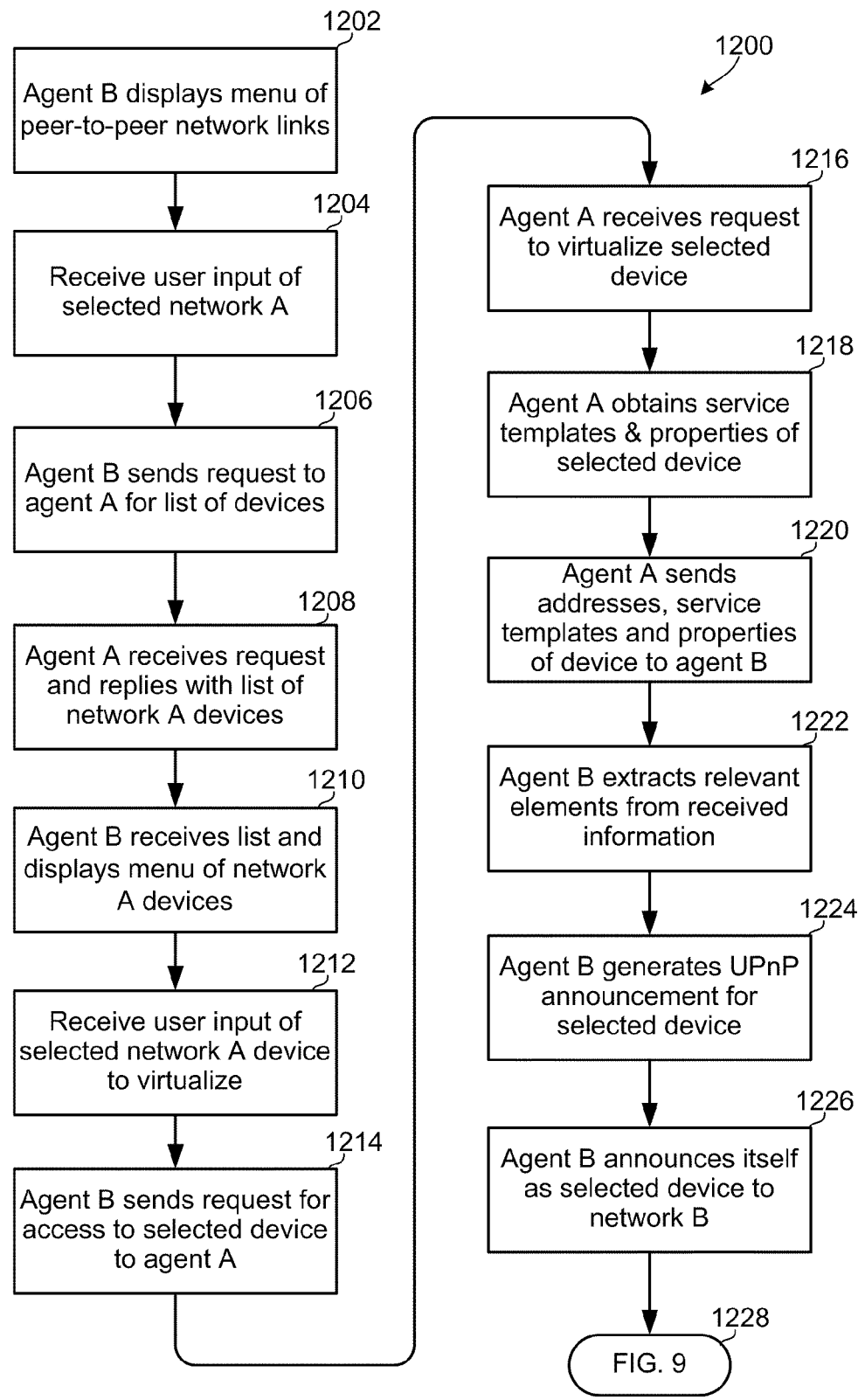
FIG. 12 is a process flow diagram of an embodiment method for using a computer on a first network to enable a device on a second network to be accessed as a virtual device on the first network.

The various embodiments may also enable a user on one network (e.g., network B) to obtain access devices, services or media in another network (e.g., network A), an example embodiment method 1200 for which is illustrated in FIG. 12. Using a computer on network B, a user may view a menu of peer-to-peer network links or networks that have been registered for access by the agent application in network B, step 1202. The computer may receive a user's input selecting a particular source network A, step 1204. The agent application on network B may then send a request message to the agent application in network A for a list of devices, services or media available on network A, step 1206. This request message may be transmitted via the peer-to-peer network via the super-peer networking server 140. The agent application in network A may receive the request message and reply with a list of UPnP devices, services and media that the agent application has discovered on network A, step 1208. This reply message may also be sent via the peer-to-peer network. The agent application in network B receives the list of devices, services and media, and generates a display of this information for the user, step 1210. This display of network A devices, services and media may be in the form of a graphical user interface to facilitate a user selection. The computer in network B may receive a user input of a selected network a device, service or media to be virtualized on a network B, step 1212. Based on the received user input, the agent application in network B may send a request for access to the selected device, service or media to the agent application in network A, step 1214. This message may be sent via the peer-to-peer network. The agent application in network A receives the request to virtualize a selected device, service or media, step 1216, and obtains the UPnP address, service templates and properties for the selected item, step 1218. The agent in network A then sends the obtained addresses, service templates and properties to the agent application in network B, step 1220. The agent application in network B extracts the relevant elements from the received information, step 1222, and generates an appropriate UPnP device advertisement message for the selected device, service or media, step 1224. As with other implementations, the agent application includes in the advertisement message a URL for the selected device, service or media that corresponds to itself, so that when the agent application transmits the device advertisement message, step 1226, it announces itself as the selected device, service or media. Once the device advertisement message is sent on network B, devices on the network may access the virtual device, service or media as described above with reference to FIGS. 9A-9C.

Figure 13:
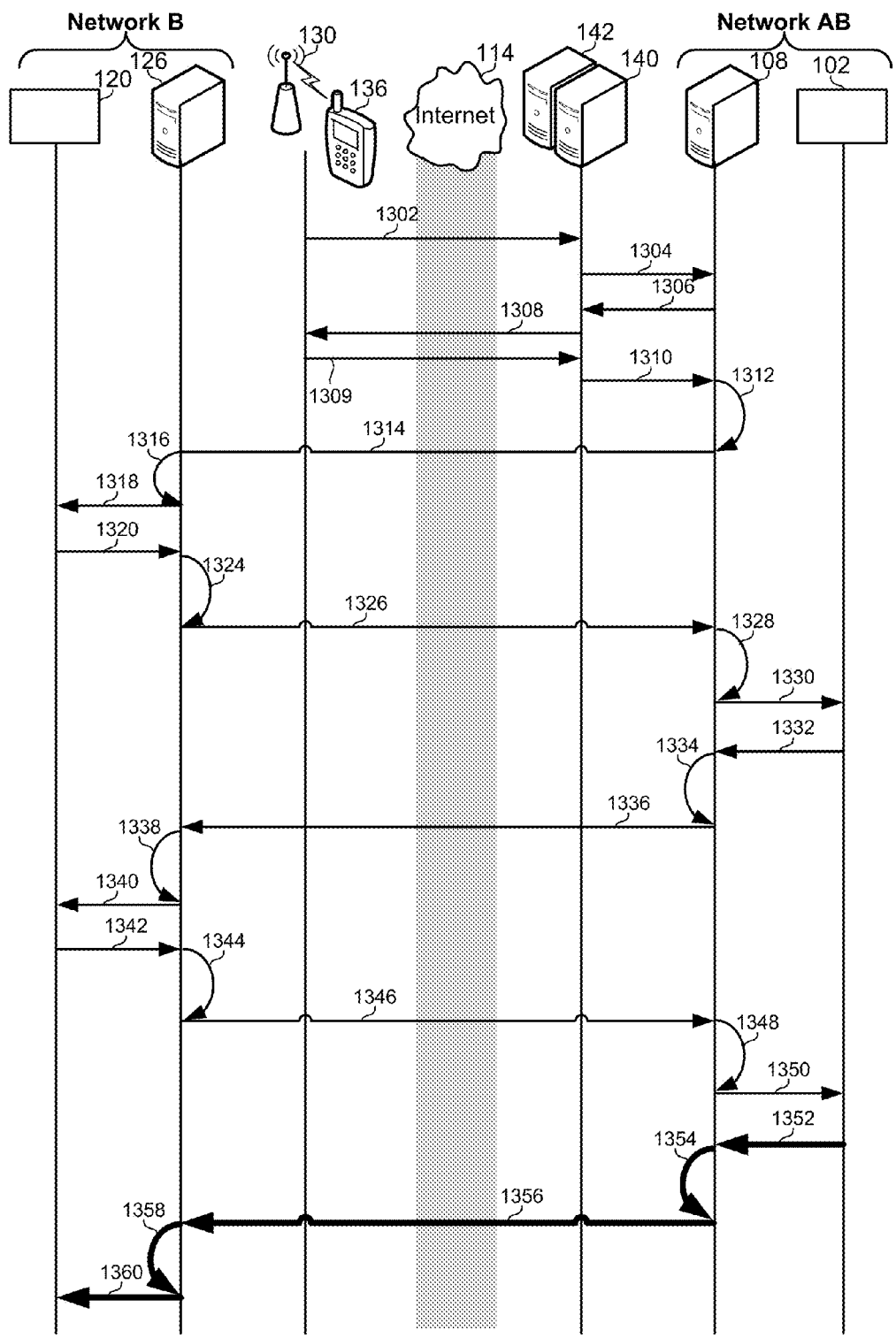
FIG. 13 is a message flow diagram o messages that may be exchanged among various components in the method illustrated in FIG. 12.

Example data messages which may be exchanged among communication system components according to the various embodiments are illustrative in FIG. 13. When a user initiates sharing of devices and services on a network B with another network A from a mobile device 136, the user may place a data call via a wireless communication network 130 and the Internet 114 to a registration server 142, message 1302. In response, the registration server 142 may send a control message to the agent application running on a computer 108 on network A requesting a listing of devices and services available on the network, message 1304. The agent application on network A may reply with a listing of the UPnP devices and services that have been discovered, message 1306.

The registration server 142 may reply to the mobile device 136 by sending this information as a list or as a webpage for display, message 1308. The user may then reply to the registration server 142 with a selected device or service to be virtualized, message 1309. The selection of a particular device or service for virtualization may be communicated to the agent application on a computer 108 on network A, message 1310. This message may include the domain ID of the target network B. The agent application may then obtain the address, service templates and properties of the selected device or service, processing 1312, and send this information to the agent application on a computer 126 on network B via the peer-to-peer network 128, message 1314. The agent application on a computer 126 on network B may then generate a UPnP device advertisement announcement, processing 1316, and transmit this announcement on network B, message 1318. A UPnP device on network B may then request a service from the virtualized device or service in accordance with the service templates in a message directed to the agent application on a computer 126 on network B, message 1320. As described above, the process of requesting a service may involve first requesting the service templates from the virtual device, which the agent application provides, and then formatting the service request using information obtained from the service templates. For sake of simplicity, such signaling between a requesting device and the agent application is not included in FIG. 13.

The agent application on a computer 126 on network B may reformat the service request into a peer-to-peer message, processing 1324, and transmit the message to the agent application on a computer 108 on network A via the peer-to-peer network, message 1326. The agent application on a computer 108 on network A processes the received service request message, processing 1328, and issues the request to the selected device, message 1330. The selected device may reply with a service response message, message 1332, which is received by the agent application on a computer 108 on network A. The agent application on a computer 108 on network A may process this service response message, processing 1334, such as to include the external IP address of network A when network A supports port forwarding, and forward the service response message to the agent application on a computer 126 on network B via the peer-to-peer network, message 1336. The agent application on a computer 126 on network B may process the received service response message, processing 1338, such as to map the device URLs as described herein, and forward the service response message to the requesting device, message 1340. For example, the service response message may be a listing of available media and associated URLs that the requesting device can access in order to obtain media data. The requesting device on network B may then access a particular URL, message 1342, which is directed to the agent application on a computer 126 on network B. The agent application on a computer 126 on network B may process the URL access, processing 1344, and forward the URL access to the agent application on a computer 108 on network A via the peer-to-peer network, message 1346. The agent application on a computer 108 on network A may process the received URL access, processing 1348, before passing the access to the selected device or service, message 1350. The selected device or service may then begin delivering the media data associated with the URL, message 1352. Depending upon the port forwarding capabilities of the source and target networks, the agent application on a computer 108 on network A may process media data packets, processing 1354, such as to buffer and push the media data to the agent application on a computer 126 on network B in message 1356. As a further alternative, the agent application on a computer 108 on network A may push the media data to a re-routing server 144 (not shown) from which the agent application on a computer 126 on network B can access the data (in which case message 1356 would be accomplished in two messages—one from the agent application on a computer 108 on network A to the re-routing server 144, and another from the re-routing server 144 to the agent application on a computer 126 on network B). Media data may be received by the agent application on a computer 126 on network B, where it may be buffered or processed, processing 1358, before delivery to the requesting device, message 1360. The messages shown in FIG. 13 are intended to be illustrative of example embodiments. The order of messages may differ from that illustrated, and fewer or more messages may be used to implement the various embodiments. Thus the messages illustrated in FIG. 13 are not intended to limit the scope of the claims in any manner.

Figure 14:
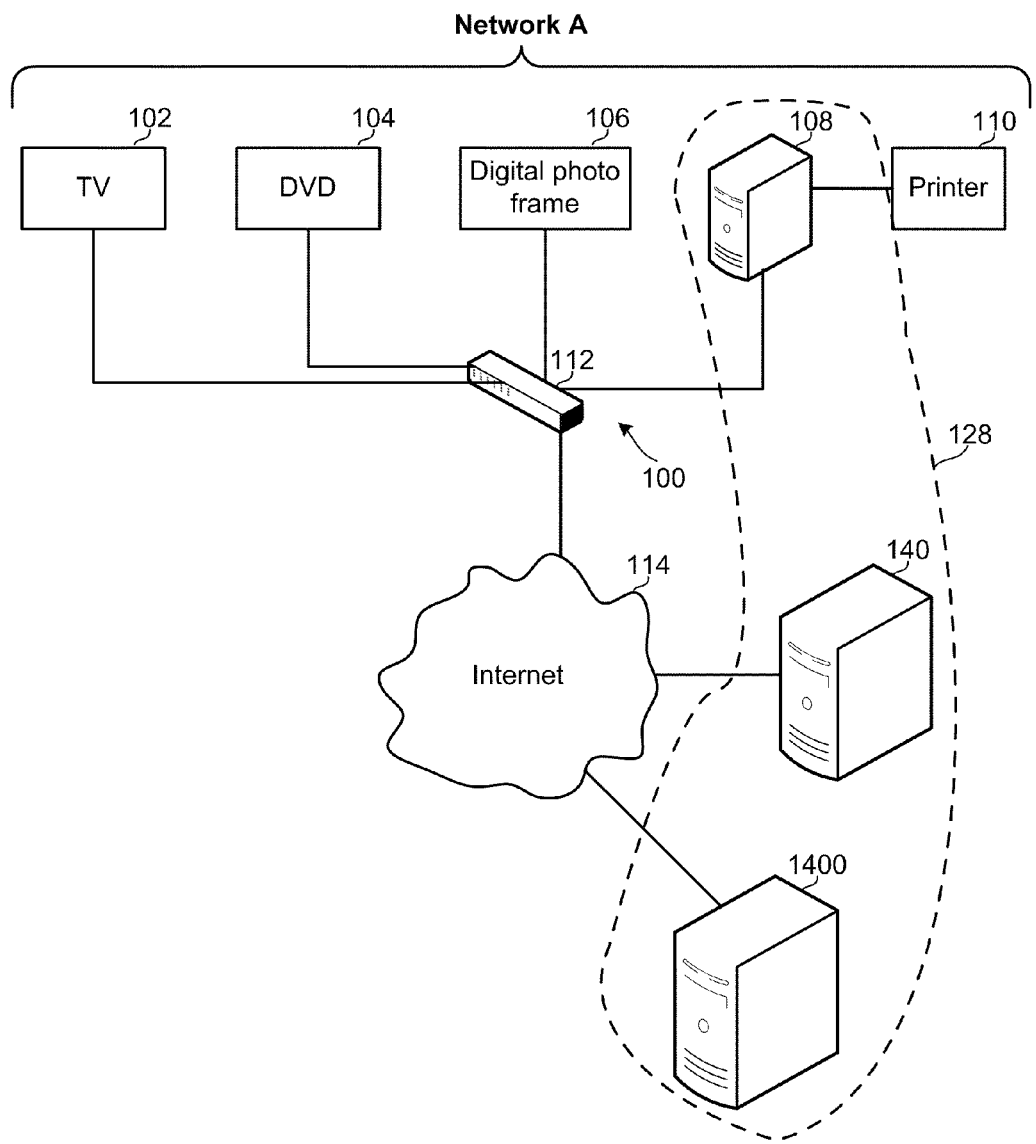
FIG. 14 is a communication block diagram of a communication system suitable for use for a particular implementation of various embodiments.

While the foregoing examples concerned sharing media among two private networks, the embodiments may be used to enable a device in a first network (referred to as network A in this example) to directly access media hosted on a server 1400 accessible via the Internet 114. FIG. 14 illustrates an example communication network supporting such an embodiment. The components of this communication network are similar to those illustrated in FIG. 1 with the exception that a media server 1400 is the source domain for media to be rendered by one of the UPnP devices 102, 104, 106, 108, 110 on network A. This embodiment may enable a UPnP media player, such as a digital television, to access media directly from a server, such as a server hosting movies in digital format, without having to process the digital media through a computer 108.

Figure 15:
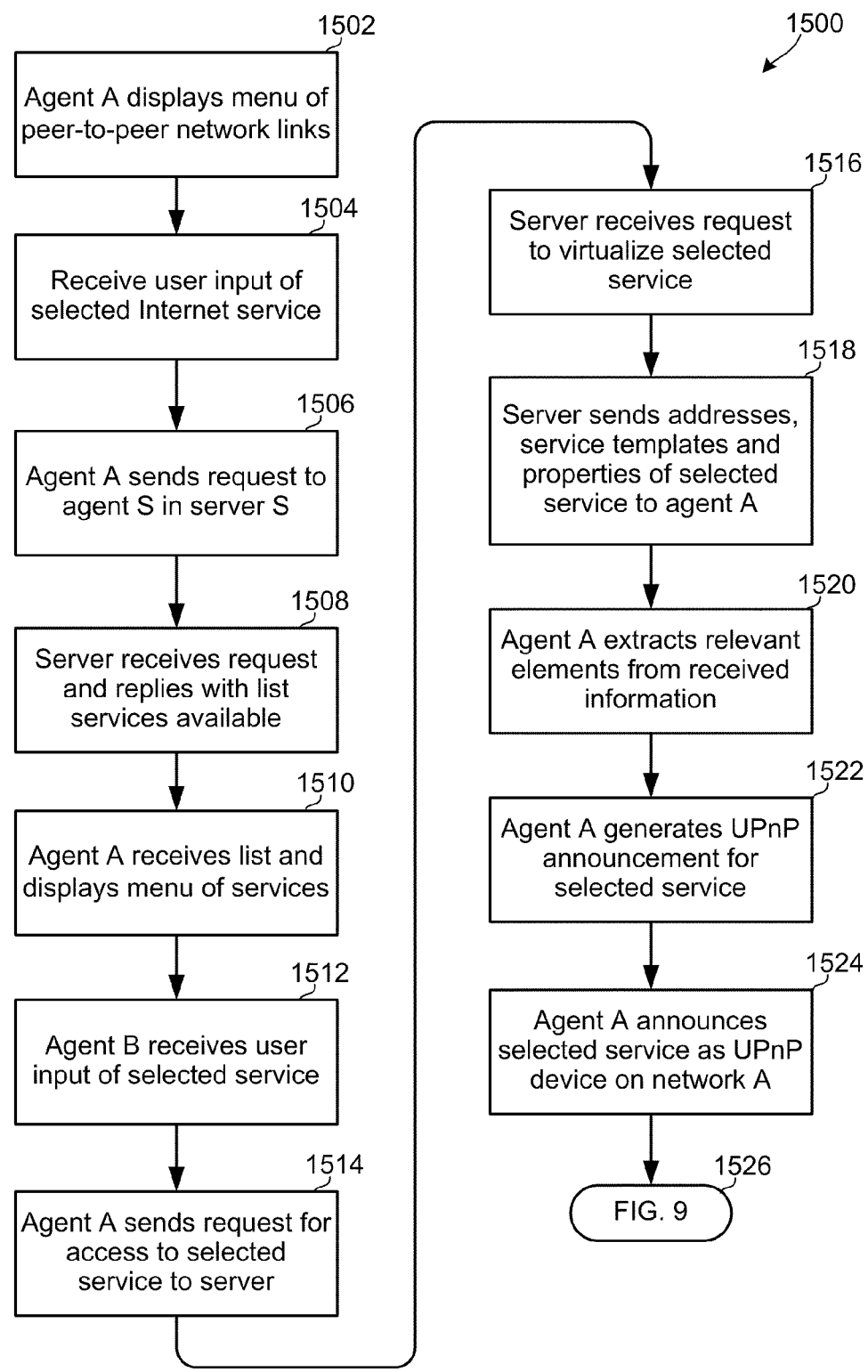
FIG. 15 is a process flow diagram of an embodiment method for enabling a device on a first network to access a server provided service as a virtual service on the first network.

An example embodiment method 1500 by which a UPnP device may access media directly from an Internet server is illustrated in FIG. 15. An agent application on a computer on network A may display a menu of peer-to-peer networks that may be accessed, step 1502, and may receive a user input of the selected Internet service, step 1504. For example, a user may select a movie rental service that provides movie rentals via an implementation of the various embodiments. In response, the agent application on network A may send a request message to the selected server S requesting a listing of available services, such as a listing of movies available for rental, step 1506. The media server receives this request and may reply with a list of available services, such as a listing of movies for which access may be rented, step 1508. This listing of available services may be received by the agent application in network A and displayed for the user, step 1510. If the user selects a particular service, such as a movie to view, this input may be received by the agent application in network A, step 1512, and used to generate and send a request to the media server for access to the selected service, step 1514. The media server receives the request to virtualize a selected service, such as a particular movie, step 1516, and in response may reply with an address, service template and properties for the selected service, step 1518. The agent application in network A then extracts the relevant elements from the received information, step 1520, and generates a UPnP advertisement message for the selected service, step 1520. The generated UPnP announcement may then be transmitted on network A, step 1524, thereby enabling UPnP devices, such as a digital television, to discover the virtual service. Once the device advertisement message is sent on network B, devices on the network may access the virtual device, service or media in a manner similar to that described above with reference to FIGS. 9A-9C.

Figure 16:
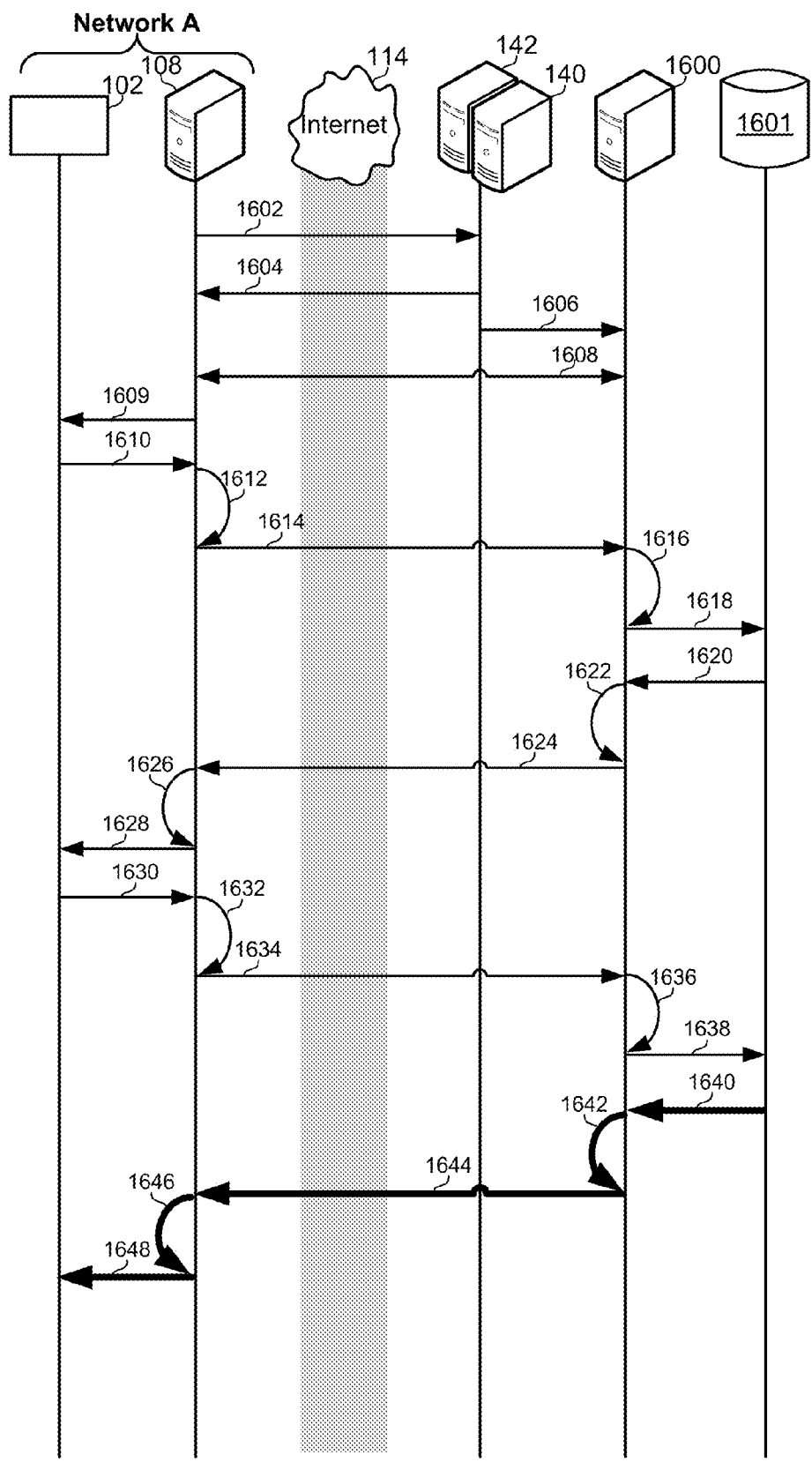
FIG. 16 is a message flow diagram of messages that may be asked changed among various components in the method illustrated in FIG. 15.

Example messages which may be exchanged among components of the communication system enabling devices on a network to directly access media stored on an Internet server are illustrated in FIG. 16. In order to directly access media data stored on an Internet media server 1600, a user may need to register the user's network with a registration server 142, message 1602. As part of the registration process, the registration server 142 may download an agent application and provide user identification information needed to access the media server 1600, message 1604. The registration server 142 may also inform the media server 1600 when a user has registered for the service, message 1606. Once a user is registered, the agent application on network A may exchange messages with the media server 1600, messages 1608, such as to exchange authentication credentials, provide the agent application with a menu of available services, and receive other service registration information. The media server 1600 may also provide the agent application on network A with information to enable it to generate a device advertisement message, message 1609, identifying the media server 1600 as a virtual device on network A.

A UPnP device on network A, such as a digital television, may issue a service request, message 1610, that the agent application on network A processes, processing 1612, and forwards to the media server 1600, message 1614. This service request message may be processed by the media server 1600, processing 1616, and may involve a data request to a media database 1601, message 1618, and a data response, message 1620, that the media server 1600 processes, processing 1622, before sending the requested information to the agent application in network A, message 1624. The agent application in network A process the received information, such as to re-map URL addresses as described herein, processing 1626, before providing the requested information to the requesting device, message 1628. For example, a digital television might request a program guide of movies available for download from the media server 1600.

A user may select a particular media to be accessed, and the corresponding media URL may be transmitted to the agent application on network A, message 1630. The agent application on network A may process the URL request, processing 1632, before transmitting the URL to the media server 1600, message 1634. The media server 1600 may process this URL request, processing 1636, and access the associated media file in a media database 1601, message 1638. The requested media may then be transmitted from the media database 1601 to the media server 1600, message 1640, which may process the media data, processing 1642, before transmitting the media data via the Internet, message 1644. Media data may be received by the agent application in network A and buffered or re-addressed, processing 1646, before being provided to the requesting device, message 1648. In an alternative embodiment, the media data may be provided to the requesting device in network A, in which case message 1644 may be addressed to the requesting device.

The various embodiments enable a number of useful implementations. For example in an embodiment, dynamic information available on one network may be displayed as a photographic image on a simple display device, such as digital photo frame. Digital photo frame devices are becoming popular for displaying user media, particularly photographs. UPnP digital photo frames are now currently available and widely used for conveniently displaying photographic media stored on a user's network. A digital photo frame may be used, for example, as a display device for rendering media received from a virtual media store according to the embodiments described above. A further implementation of this idea enables dynamic information, such as web pages, and textual information, such as e-mail and twitter messages, to be displayed as photographs on a digital photo frame. Using the various embodiments, such display methods may be very useful to users in a number of applications.

Figure 17:
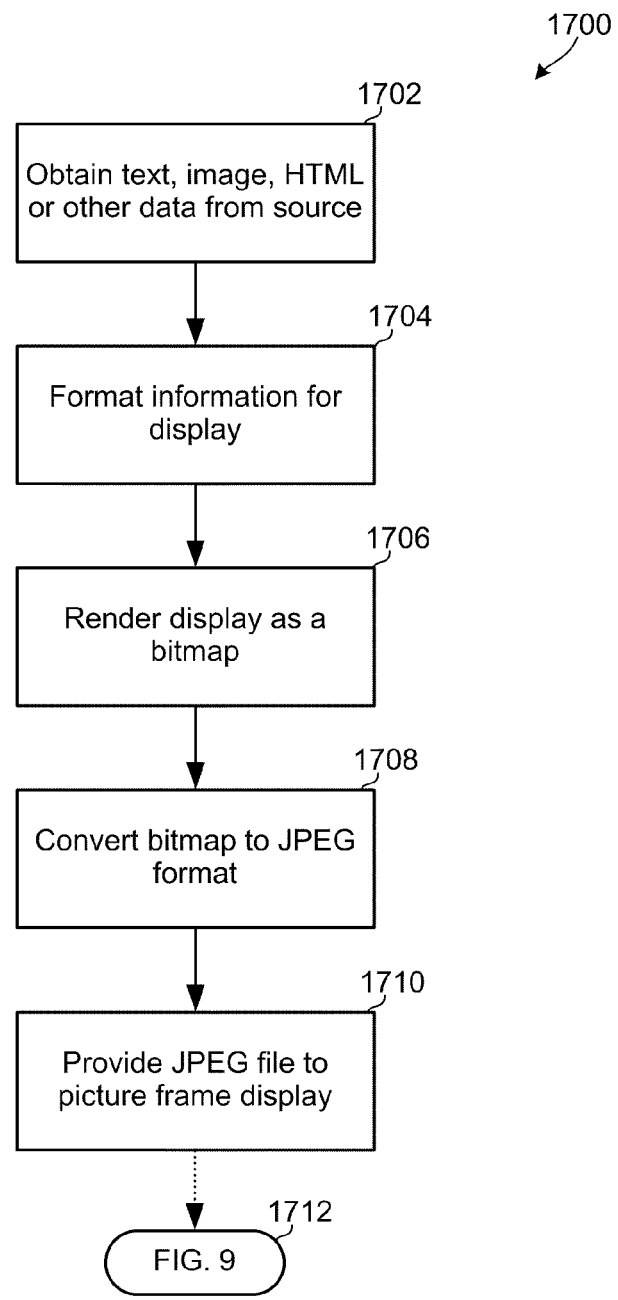
FIG. 17 is a process flow diagram of an embodiment method for displaying a dynamic file as a static image in a digital photograph display.

An example embodiment method 1700 for rendering dynamic and textual information on a digital photo frame is illustrated in FIG. 17. This embodiment method may be implemented on a computer with access to the dynamic or textual information to be rendered. Such a computer may access a file or URL to obtain text, image, HTML or other data from a dynamic data source, step 1702. For example, a computer may access a user's e-mail or twitter account to obtain the user's latest messages. The computer then formats the obtained information into a format suitable for display, step 1704. For example, if the obtained information is an e-mail message, the message may be formatted in a manner similar to how it would be presented on a display of e-mail in an e-mail application. The formatted data is then rendered as an in-memory bitmap, step 1706. The bitmap is then converted into a digital photograph data format, such as the JPEG format, and saved in memory, step 1708. The digital photograph data, such as the JPEG file, is then communicated to the digital photo frame display, 1710. For example, the digital photograph data may be stored in the memory of the digital photo frame, or in a data store on the local network, which the digital photo frame accesses. In a further embodiment, the digital photograph data may be stored on a device which has been virtualized on another network as described in the previous embodiments, thereby enabling a digital photo frame on the other network to access and display the image in a manner similar to that described above with reference to FIGS. 9A-9C, step 1712.

Figure 18:
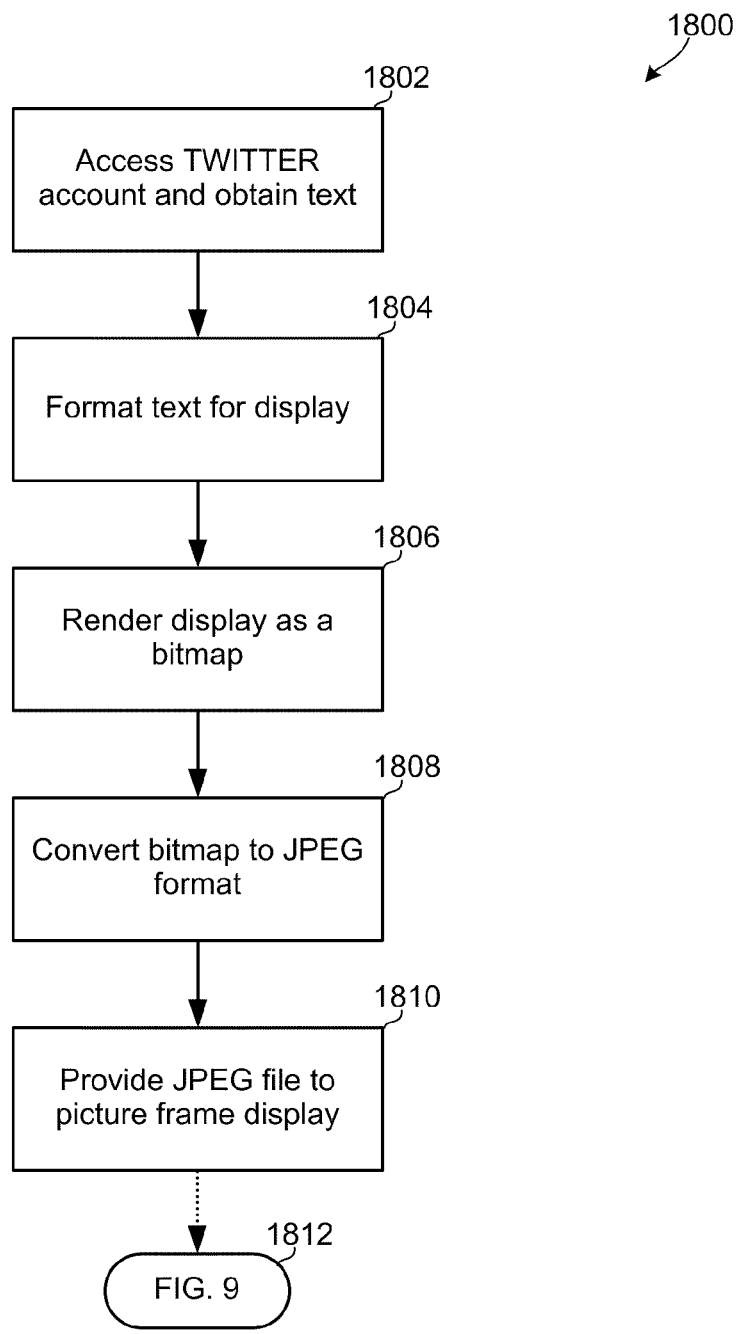
FIG. 18 is a process flow diagram of an example implementation of the method illustrated in FIG. 17.

A particular example implementation of this embodiment is illustrated in FIG. 18 in which "tweets" on a user's Twitter account are rendered for display on a digital photo frame. A computer may access the user's Twitter account and obtain the latest message text, step 1802. The Twitter text may then be formatted for display, step 1804, which is rendered as a bitmap, step 1806. The bitmap image is then converted to JPEG format, step 1808, and the resulting JPEG file is provided to a digital photo frame, step 1810. Alternatively, the resulting JPEG file may be stored on a device which has been virtualized on another network, enabling the JPEG file to be displayed in a digital photo frame on that other network in a manner similar to that described above to reference FIGS. 9A-9C, step 1812.

Figure 19:
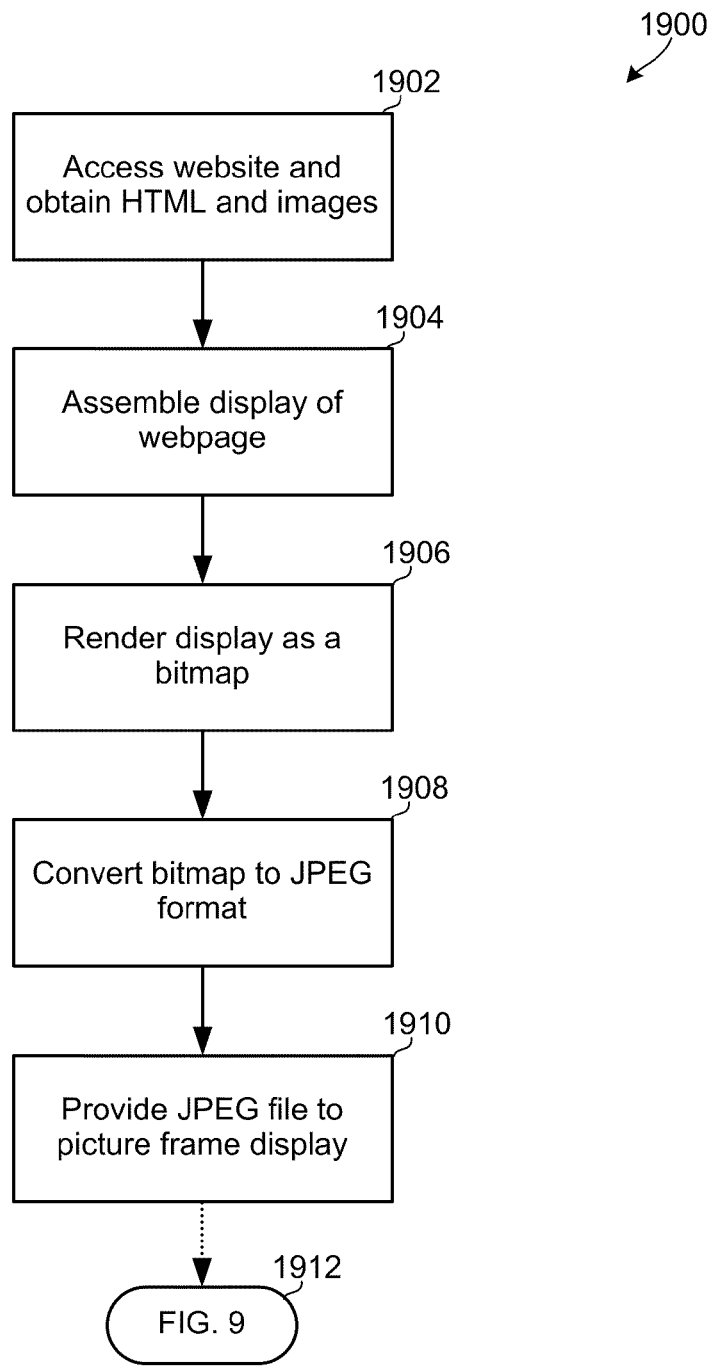
FIG. 19 is a process flow diagram of another example implementation of the method illustrated in FIG. 17

Another example implementation of this embodiment is illustrated in FIG. 19 in which dynamic web pages, such as news websites, stock quotes, and webcam feeds are rendered for display on a digital photo frame. A computer may access a particular website and obtain the latest HTML scripts and images, step 1902. The obtained HTML and images may then be formatted for display, such as by generating the corresponding webpage using a web browser application, step 1904. The generated webpage is then rendered as a bitmap, step 1906, and the bitmap image is converted to JPEG format, step 1908. The resulting JPEG file may be provided to a digital photo frame, step 1910. Alternatively, the resulting JPEG file may be stored on a device which has been virtualized on another network, enabling the JPEG file to be displayed in a digital photo frame on that other network in a manner similar to that described above to reference FIGS. 9A-9C, step 1912.

Figure 20:
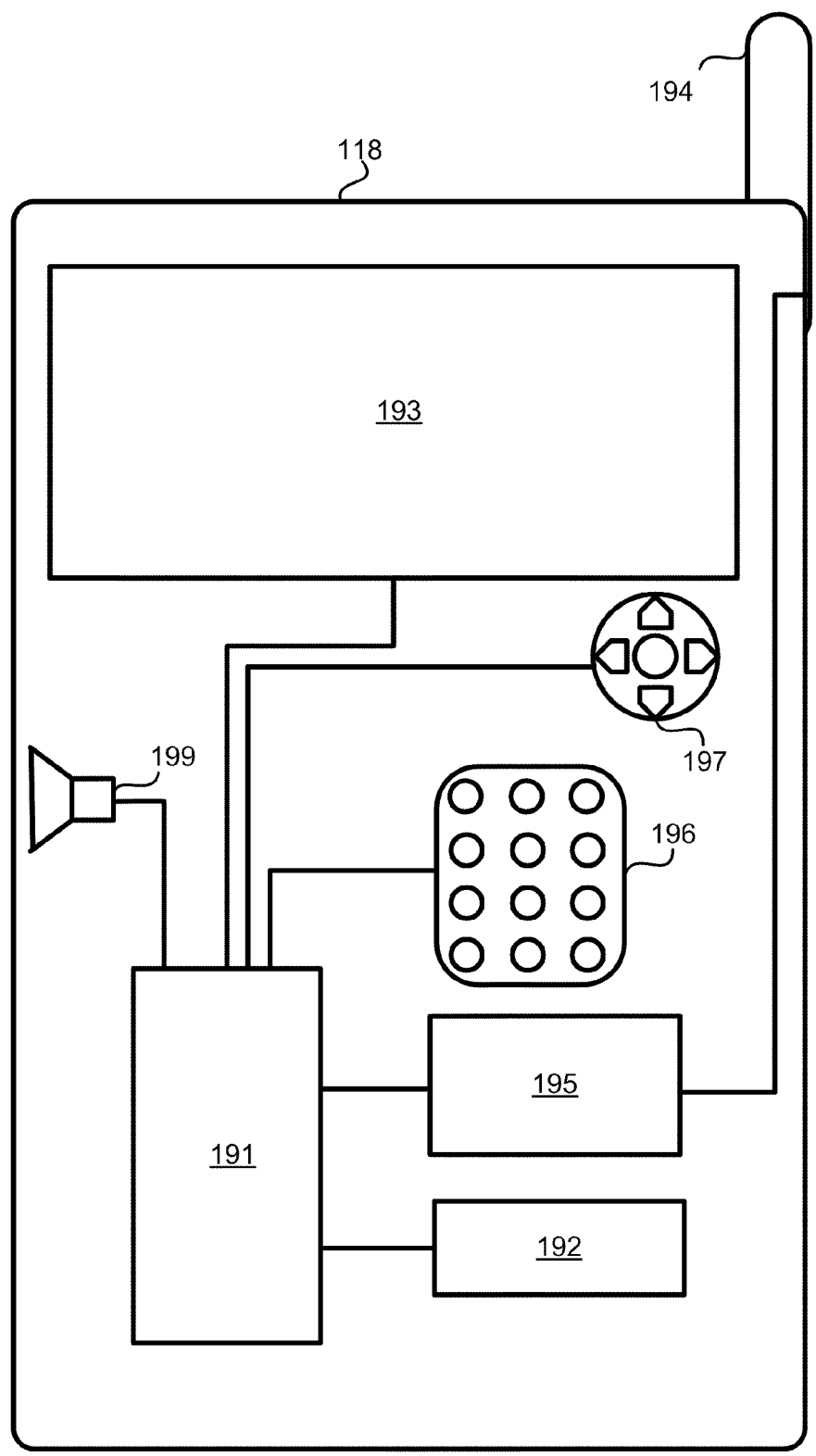
FIG. 20 is a component block diagram of a personal computer suitable for use with various embodiments.

The "controller" used to initiate device or file sharing by accessing the registration server 142 (or other server) in the various embodiments may be any device which hosts or provides a web browser, such as a personal computer 138, webbook, or mobile device 136. A mobile device 136, such as a cellular telephone may be a particularly convenient device for use as the controller since its small size and other utilities mean that users will typically have one with them or nearby. Typical mobile devices 136 suitable for use with the various embodiments will have in common the components illustrated in FIG. 20. For example, an exemplary mobile device 136 may include a processor 191 coupled to internal memory 192, and a display 193. Additionally, the mobile device 136 may have an antenna 194 for sending and receiving electromagnetic radiation that is connected to a wireless data link and/or cellular telephone transceiver 195 coupled to the processor 191. Mobile devices typically also include a key pad 196 or miniature keyboard and menu selection buttons or rocker switches 197 for receiving user inputs.

Figure 21:
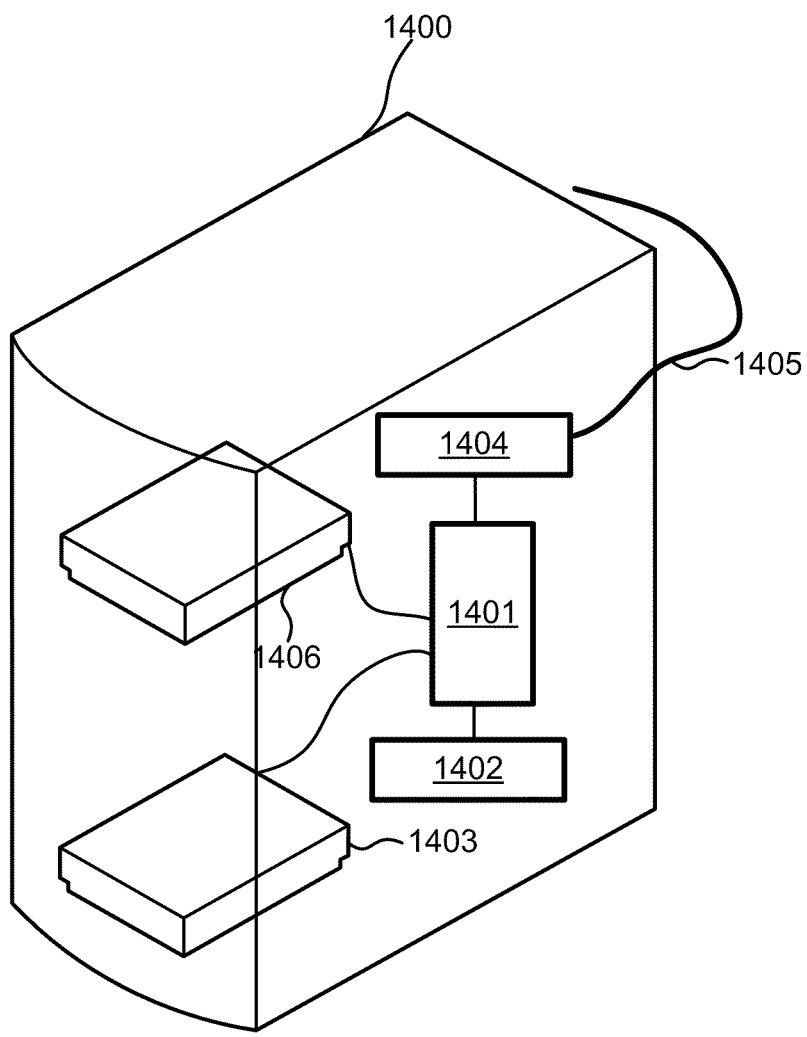
FIG. 21 is a component block diagram of a server suitable for use with various embodiments.

The embodiments described above may be implemented with any of a variety of server devices, such as the server 1400 illustrated in FIG. 21. Such a server 1400 typically includes a processor 1401 coupled to volatile memory 1402 and a large capacity nonvolatile memory, such as a disk drive 1403. The server 1400 may also include a floppy disc drive and/or a compact disc (CD) drive 1406 coupled to the processor 1401. The server 1400 may also include network access ports 1404 coupled to the processor 1401 for establishing data connections with network circuits 1405, such as the Internet.

Figure 22:
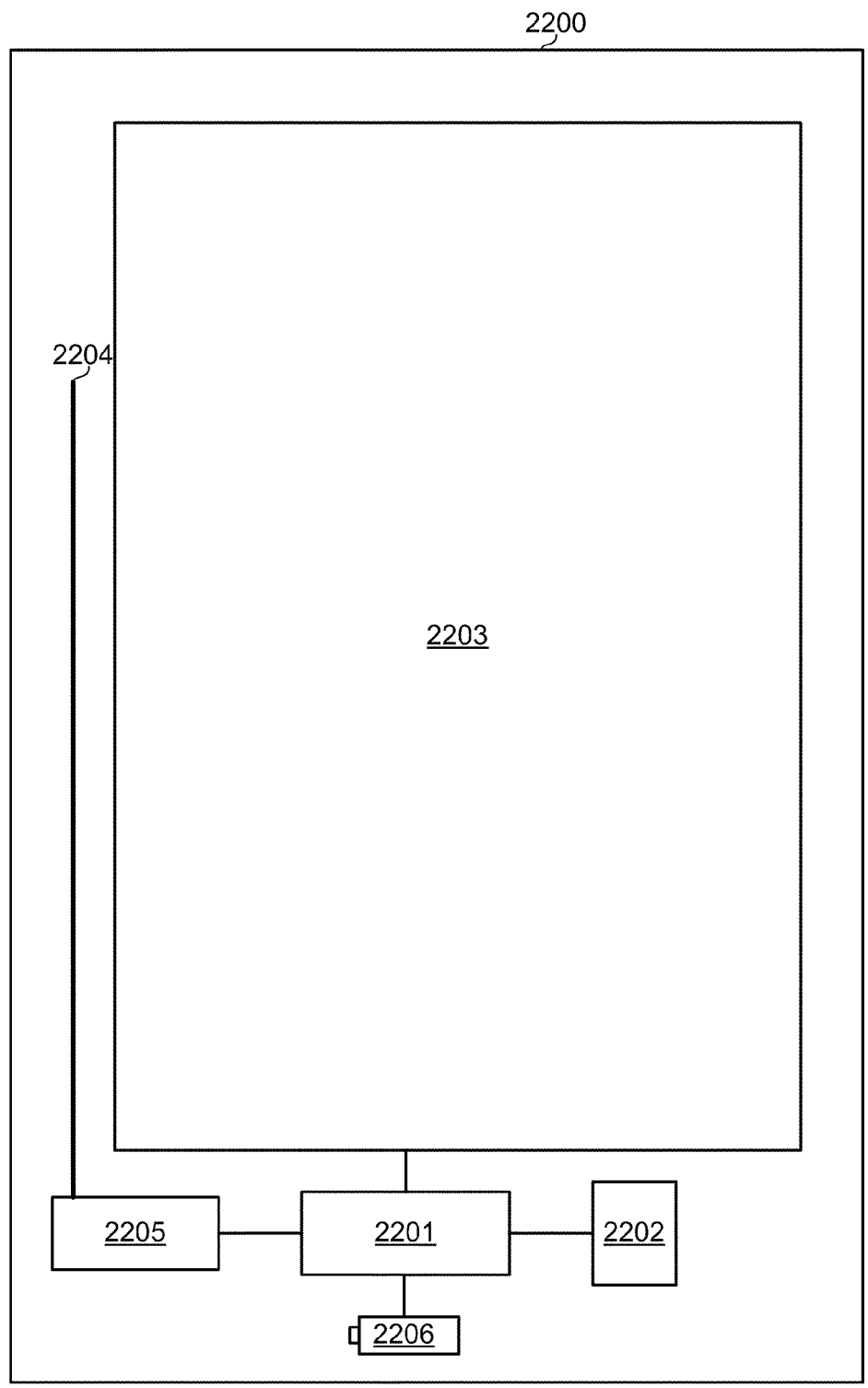
FIG. 22 is a component block diagram of a digital photo display suitable for use with various embodiments.

The embodiments described above may also implement a digital photo frame as illustrated in FIG. 22. Such a digital photo frame 2200 typically includes a processor 2201 coupled to memory 2202 and a large display 2203. The digital photo frame 2200 may also include a wireless data link transceiver 2205 coupled to an antenna 2204, as well as a battery 2206 coupled to the processor 2201. The processor 2201 may be configured to announce its plug-n-play parameters and service templates on wireless networks accessed via the wireless data link transceiver 2205.

The processors 191, 1401, 2201 in the various devices may be any programmable microprocessor, microcomputer or multiple processor chip or chips that can be configured by software instructions (applications) to perform a variety of functions, including the functions of the various embodiments described herein. In some devices, multiple processors 191, 1401, 2201 may be provided, such as one processor dedicated to wireless communication functions and one processor dedicated to running other applications. Typically, software applications may be stored in the internal memory 192, 1402, 2202 before they are accessed and loaded into the processor 191, 1401, 2201. In some mobile devices, the processor 191, 1401, 1501 may include internal memory sufficient to store the application software instructions. In some devices, the secure memory may be in a separate memory chip coupled to the processor 191, 1401, 2201. In many devices the internal memory 192, 1402, 2202 may be a volatile or nonvolatile memory, such as flash memory, or a mixture of both. For the purposes of this description, a general reference to memory refers to all memory accessible by the processor 191, 1401, 2201, including internal memory 192, 1402, 2202 removable memory plugged into the device, and memory within the processor 191, 1401, 2201 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for accessing a first device located on a first network from a second device located on a second network, the method comprising:

linking, using a second agent application operating on a second computer of the second network, the first network and the second network via a peer-to-peer network, wherein the first network includes the first device and a first agent application operating on a first computer and the second network includes the second device and the second agent application operating on the second computer;

obtaining an address, service template and property information regarding the first device in the first network using the first agent application;

transmitting the address, service template and property information regarding the first device from the first agent application of the first network to the second agent application of the second network;

generating, using the second agent application of the second network, a device advertisement message on the second network for the first device of the first network based, at least in part, on the address, service template and property information regarding the first device, wherein the device advertisement message includes an address for the second agent application as a network address for the first device on the second network;

receiving, at the second agent application, an access request message for the first device from the second device on the second network; and communicating the access request message for the first device from the second agent application to the first network via the peer-to-peer network.

2. The method of claim 1, further comprising communicating a service response message from the first device to the second device by:
receiving the service response message from the first device in the first agent application in the first network;
transmitting the service response message from the first agent application to the second agent application in the second network via the peer-to-peer network; and
providing the service response message from the second agent application to the second device.

3. The method of claim 2, further comprising:
receiving, at the second agent application, an Internet Protocol (IP) address for the first network from the first agent application; and
mapping a universal resource locator (URL) in the service response message to a URL including the IP address for the first network prior to providing the service response message from the second agent application to the second device.

4. The method of claim 2, further comprising:
obtaining an Internet Protocol (IP) address for the second network in the second agent application;
receiving a URL access message from the second device in the second agent application;
converting the URL access message into a control message; and
transmitting the control message from the second agent application to the first agent application, wherein the control message includes the IP address for the second network and is formatted to cause the first agent application to:
access a media file in the first device associated with the URL;
receive media data from the first device; and
push the media data to the second agent application using the IP address for the second network without passing media data through the peer-to-peer network.

5. The method of claim 1, further comprising:
receiving a URL access message from the second device in the second agent application operating on the second computer in the second network;
converting the URL access message into a control message; and
transmitting the control message from the second agent application to the first agent application operating on the first computer in the first network,
wherein:
the control message includes an IP address for a re-routing server located in a wide area network and is formatted to cause the first agent application to:
access a media file in the first device associated with the URL;
receive media data from the first device; and
push the media data to the re-routing server using the IP address included in the control message without passing the media data through the peer-to-peer network to cause the re-routing server to transmit the media data to the second agent application;
receiving, at the second agent application, the media data from the first agent application via the re-routing server; and
providing the media data from the second agent application to the second device.

6. The method of claim 5, wherein the wide area network is an Internet.

7. A method of claim 1, further comprising:
accessing a source of data to obtain a data file;
formatting the obtained data file into a format suitable for display;
rendering the formatted obtained data file as an in-memory bitmap;
transforming the bitmap into a digital photograph data format; and
storing the digital photograph data on the first device, wherein the second device is a digital photo frame device.

8. The method of claim 7, wherein the digital photograph data format is JPEG format.

9. A first computer, comprising:
a processor; and
a first network interface circuit coupled to the processor and configured to allow the processor to communicate with a first network including a first device, wherein the first network includes the first device and a first agent application operating on the first computer, wherein the processor is configured with processor-executable instructions, which when executed by the processor causes the processor to perform operations that comprise:
communicating with a second network via a peer-to-peer network, wherein the second network includes a second device and a second agent application operating on a second computer;
obtaining, via the first agent application, an address, service template and property information regarding the second device in the second network from the second agent application, wherein said obtaining comprises receiving, via the first agent application, a transmission including the address, service template and property information regarding the second device of the second network from the second agent application;
generating, using the first agent application, a device advertisement message on the first network for the second device located on the second network based, at least in part, on the address, service template and property information regarding the second device, wherein the device advertisement message includes an address for the first agent application as a network address for the second device on the first network;
receiving, via the first agent application, an access request message for the second device on the second network from the first device on the first network; and
communicating the access request message for the second device to the second network via the peer-to-peer network.

10. The first computer of claim 9, wherein the processor is configured with processor executable instructions, which when executed by the processor causes the processor to perform operations that comprise:
receiving, via the first agent application, a service response message from the second agent application of the second network via the peer-to-peer network, and
providing the service response message from the first agent application to the first device.

11. The first computer of claim 10, wherein the processor is configured with processor executable instructions, which when executed by the processor causes the processor to perform operations that comprise:
receiving, via the first agent application, an Internet Protocol (IP) address for the second network from the second agent application; and
mapping a universal resource locator (URL) in the service response message to a URL including the IP address for the second network prior to providing the service response message from the first agent application to the first device.

12. The first computer of claim 10, wherein the processor is configured with processor-executable instructions, which when executed by the processor causes the processor to perform operations that comprise:
    obtaining, via the first agent application, an Internet Protocol (IP) address for the first network;
    receiving, via the first agent application, a URL access message from the first device;
    converting the URL access message into a control message including the IP address for the first network;
    transmitting the control message from the first agent application to the second agent application of the second network; and
    receiving media data from the second agent application of the second network.

13. The first computer of claim 9, wherein the processor is configured with processor-executable instructions, which when executed by the processor causes the processor to perform operations that comprise:
    receiving, via the first agent application, a URL access message from the first device;
    converting the URL access message into a control message including an IP address for a re-routing server located in a wide area network;
    transmitting the control message from the first agent application to the second agent application of the second network; and
    accessing, using the first agent application, media data from the re-routing server.

14. The first computer of claim 9, wherein the processor is configured with processor-executable instructions, which when executed by the processor causes the processor to perform operations that comprise:
    accessing a source of data to obtain a data file;
    formatting the obtained data file into a format suitable for display;
    rendering the formatted obtained data file as an in-memory bitmap;
    transforming the bitmap into a digital photograph data format; and
    providing the digital photograph data to the second device, wherein the first device is a digital photo frame device.

15. The first computer of claim 14, wherein the digital photograph data format is JPEG format.

16. A system for accessing a first device located on a first network from a second device located on a second network, the system comprising:
    means for linking, using a second agent application operating on a second computer of the second network, the first network and the second network via a peer-to-peer network, wherein the first network includes the first device and a first agent application operating on a first computer and the second network includes the second device and the second agent application operating on the second computer;
    means for obtaining an address, service template and property information regarding the first device in the first network using the first agent application;
    means for receiving a transmission including the address, service template and property information regarding the first device, at the second agent application of the second network from the first agent application of the first network;
    means for generating, using the second agent application, a device advertisement message on the second network for the first device of the first network based, at least in part, on the address, service template and property information regarding the first device, wherein the device advertisement message includes an address for the second agent application as a network address for the first device on the second network;
    means for receiving, at the second agent application, an access request message for the first device from the second device on the second network; and
    means for communicating the access request message for the first device from the second agent application to the first network via the peer-to-peer network.

17. The system of claim 16, further comprising means for communicating a service response message from the first device to the second device, comprising:
    means for receiving the service response message from the first device in the first agent application in the first network;
    means for transmitting the service response message from the first agent application to the second agent application in the second network via the peer-to-peer network; and
    means for providing the service response message from the second agent application to the second device.

18. The system of claim 17, further comprising:
    means for receiving, at the second agent application, an Internet Protocol (IP) address for the first network from the first agent application; and
    means for mapping a universal resource locator (URL) in the service response message to a URL including the IP address for the first network prior to providing the service response message from the second agent application to the second device.

19. The system of claim 17, further comprising:
    means for obtaining an Internet Protocol (IP) address for the second network in the second agent application;
    means for receiving a URL access message from the second device in the second agent application;
    means for converting the URL access message into a control message; and
    means for transmitting the control message from the second agent application to the first agent application, wherein the control message includes the IP address for the second network and is formatted to cause the first agent application to:
        access a media file in the first device associated with the URL;
        receive media data from the first device; and
        push the media data to the second agent application using the IP address for the second network without passing media data through the peer-to-peer network.

20. The system of claim 16, further comprising:
    means for receiving a URL access message from the second device in the second agent application operating on the second computer in the second network;
    means for converting the URL access message into a control message; and
    means for transmitting the control message from the second agent application to a first agent application operating on the first computer in the first network,
    wherein:
        the control message includes an IP address for a re-routing server located in a wide area network and is formatted to cause the first agent application to:
            access a media file in the first device associated with the URL;

receive media data from the first device; and
push the media data to the re-routing server using the IP address included in the control message without passing the media data through the peer-to-peer network to cause the re-routing server to transmit the media data to the second agent application;
means for receiving, at the second agent application, the media data from the first agent application via the re-routing server; and
means for providing the media data from the second agent application to the second device.

21. A system of claim 16, further comprising:
means for accessing a source of data to obtain a data file;
means for formatting the obtained data file into a format suitable for display;
means for rendering the formatted obtained data file as a bitmap;
means for transforming the bitmap into a digital photograph data format; and
means for storing the digital photograph data on the first device, wherein the second device is a digital photo frame device.

22. The system of claim 21, wherein the digital photograph data format is JPEG format.

23. A non-transitory machine-readable storage medium having instructions stored therein, which when executed by one or more processors causes the one or more processors to perform operations that comprise:
linking a first network and a second network via a peer-to-peer network using a second agent application operating on a second computer of the second network, wherein the first network includes the first device and a first agent application operating on a first computer and the second network includes the second device and the second agent application operating on the second computer;
obtaining an address, service template and property information regarding the first device in the first network using the first agent application;
receiving a transmission including the address, service template and property information regarding the first device, at the second agent application of the second network from the first agent application of the first network;
generating, using the second agent application, a device advertisement message on the second network for the first device of the first network based, at least in part, on the address, service template and property information regarding the first device received from the first agent application, wherein the device advertisement message includes an address for the second agent application as a network address for the first device on the second network;
receiving, at the second agent application, an access request message for the first device from the second device on the second network; and
communicating the access request message for the first device from the second agent application to the first network via the peer-to-peer network.

24. The non-transitory machine-readable storage medium of claim 23, wherein the operations further comprise:
communicating a service response message from the first device to the second device including receiving the service response message from the first device in the first agent application in the first network, and transmitting the service response message from the first agent application to the second agent application in the second network via the peer-to-peer network, and
providing the service response message from the second agent application to the second device.

25. The non-transitory machine-readable storage medium of claim 24, wherein the operations further comprise:
receiving, at the second agent application, an Internet Protocol (IP) address for the first network from the first agent application; and
mapping a universal resource locator (URL) in the service response message to a URL including the IP address for the first network prior to providing the service response message from the second agent application to the second device.

26. The non-transitory machine-readable storage medium of claim 24, wherein the operations further comprise:
obtaining an Internet Protocol (IP) address for the second network in the second agent application;
receiving a URL access message from the second device in the second agent application;
converting the URL access message into a control message; and
transmitting the control message from the second agent application to the first agent application, wherein the control message includes the IP address for the second network and is formatted to cause the first agent application to:
access a media file in the first device associated with the URL;
receive media data from the first device; and
push the media data to the second agent application using the IP address for the second network without passing media data through the peer-to-peer network.

27. The non-transitory machine-readable storage medium of claim 23, wherein the operations further comprise:
receiving a URL access message from the second device in the second agent application operating on the second computer in the second network;
converting the URL access message into a control message; and
transmitting the control message from the second agent application to the first agent application operating on the first computer in the first network,
wherein:
the control message includes an IP address for a re-routing server located in a wide area network and is formatted to cause the first agent application to:
access a media file in the first device associated with the URL;
receive media data from the first device; and
push the media data to the re-routing server using the IP address included in the control message without passing the media data through the peer-to-peer network to cause the re-routing server to transmit the media data to the second agent application;
receiving, at the second agent application, the media data from the first agent application via the re-routing server; and
providing the media data from the second agent application to the second device.

28. A non-transitory machine-readable storage medium of claim 23, wherein the operations further comprise:
accessing a source of data to obtain a data file;
formatting the obtained data file into a format suitable for display;
rendering the formatted obtained data file as an in-memory bitmap;
transforming the bitmap into a digital photograph data format; and storing the digital photograph data on the first device, wherein the second device is a digital photo frame device.

29. The non-transitory machine-readable storage medium of claim 28, wherein the digital photograph data format is JPEG format.

\* \* \* \* \*